Figure 1:
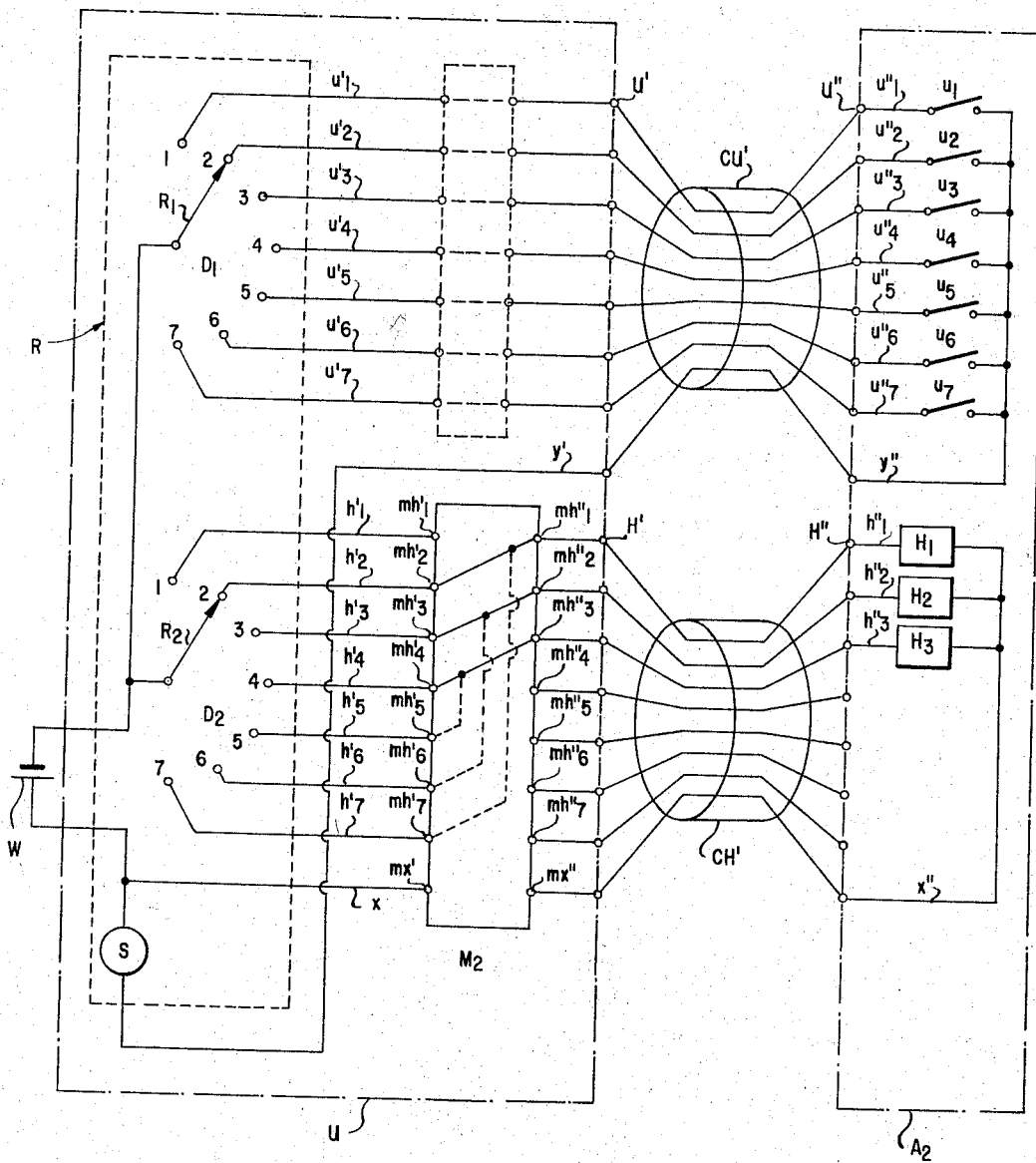

INVENTOR.
HERMANN BØRGE FUNCK JENSEN
BY Dicke & Craig
ATTORNEYS.

May 23, 1967 H. B. F. JENSEN 3,321,744
AUTOMATION CONTROL SYSTEM FOR WORKING MACHINES OR THE LIKE
Filed March 16, 1962 19 Sheets-Sheet 3

INVENTOR.
HERMANN BØRGE FUNCK JENSEN
BY Dicke & Craig
ATTORNEYS.

May 23, 1967 H. B. F. JENSEN 3,321,744
AUTOMATION CONTROL SYSTEM FOR WORKING MACHINES OR THE LIKE
Filed March 16, 1962 19 Sheets-Sheet 4

INVENTOR.
HERMANN BØRGE FUNCK JENSEN
BY Dicke & Craig
ATTORNEYS.

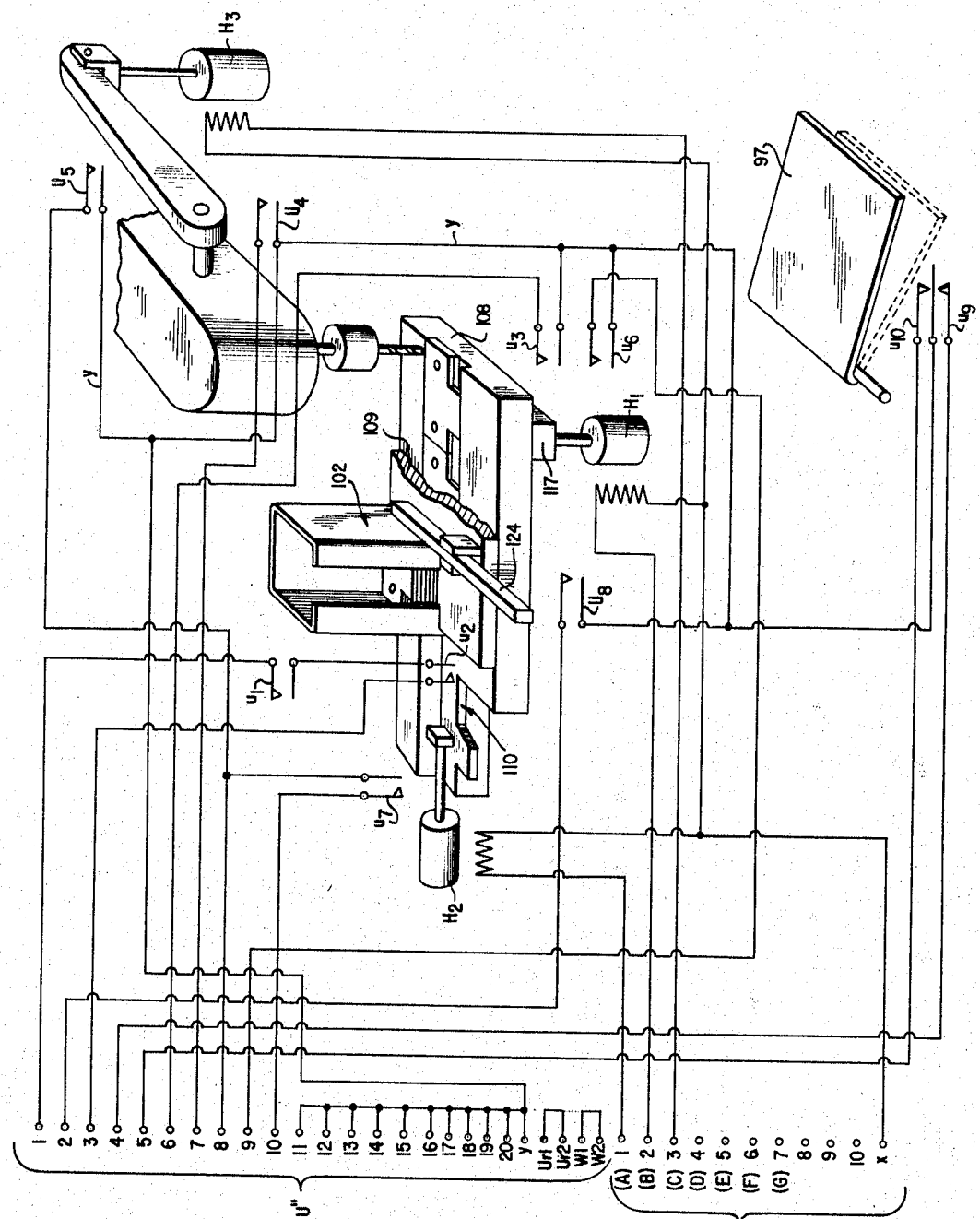

INVENTOR.
HERMANN BØRGE FUNCK JENSEN
BY Dicke & Craig
ATTORNEYS.

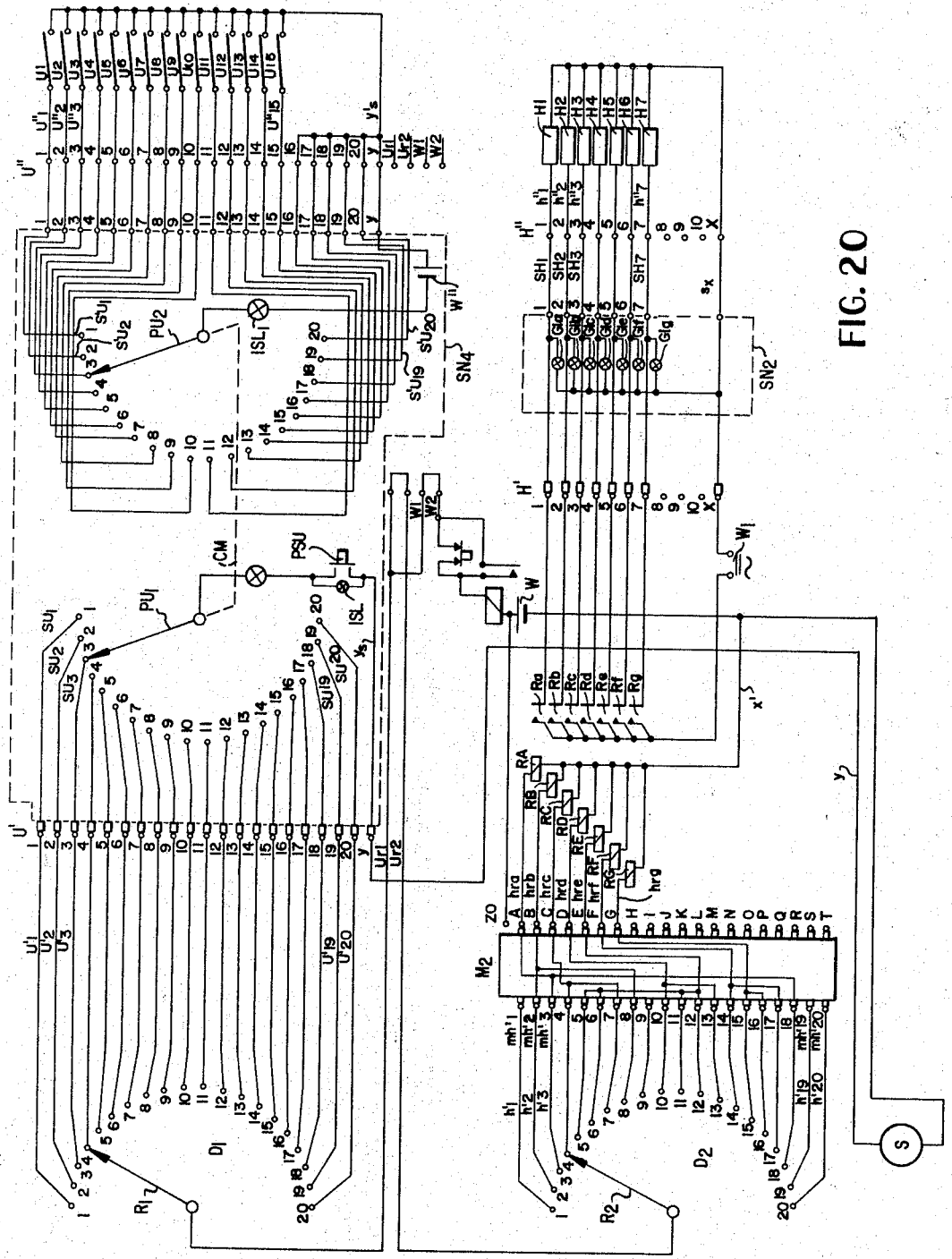

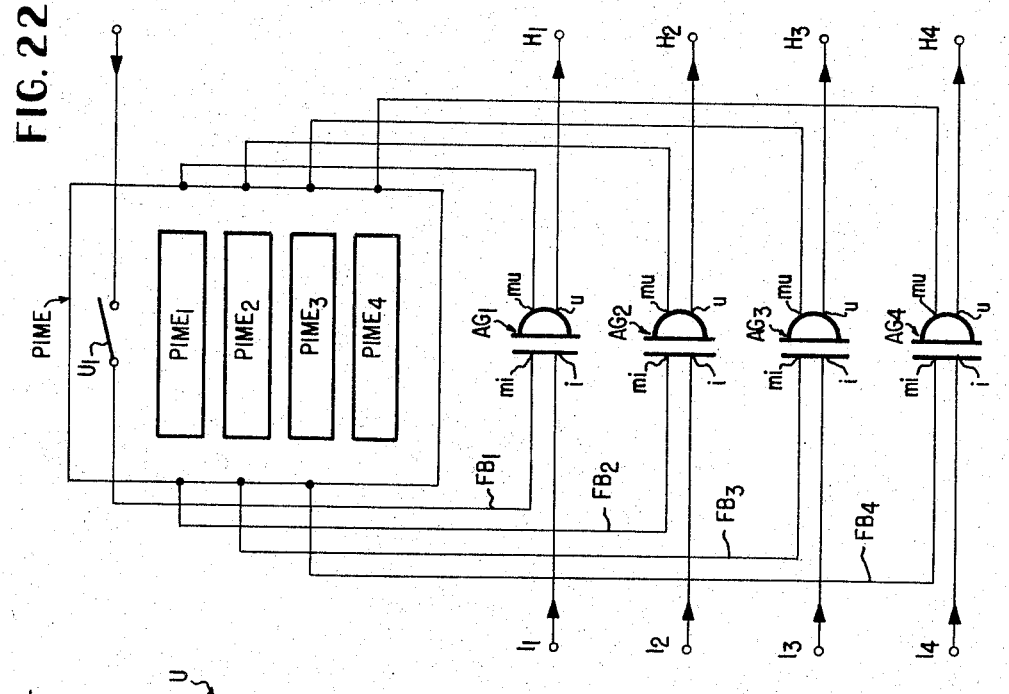
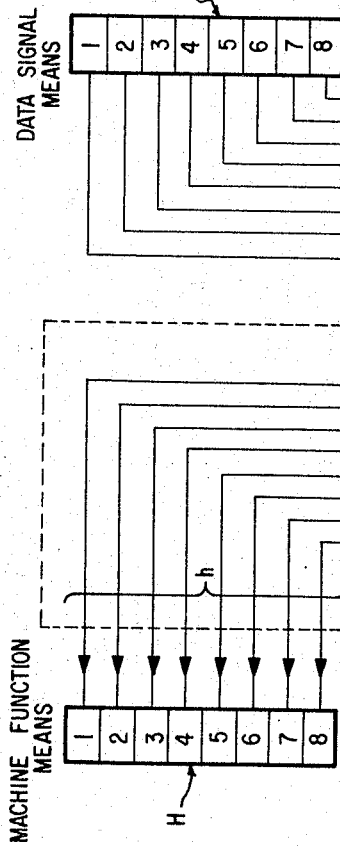

United States Patent Office 3,321,744
Patented May 23, 1967

3,321,744
AUTOMATION CONTROL SYSTEM FOR WORKING MACHINES OR THE LIKE
Hermann Børge Funck Jensen, Klintergarden I,
Arhus, Denmark
Filed Mar. 16, 1962, Ser. No. 180,159
Claims priority, application Great Britain, Oct. 12, 1956,
31,087/56
34 Claims. (Cl. 340—163)

This is a continuation-in-part application of my application Ser. No. 689,620, filed Oct. 11, 1957, now abandoned, and relating to automatic control systems.

The present invention relates to automation of working machines.

It is an object of the invention to provide control apparatuses for running a working machine automatically through a cycle of operations.

It is a further purpose of the invention to provide a sequence control for a working machine having a plurality of electrically controlled operation performing members adapted to perform a programme.

Still a further purpose of the invention is to provide control means for use in a control system for running a machine having a plurality of electrically controlled operation performing members controlled by command signals and a plurality of data signal means adapted to produce data signals through a cycle folowing a predetermined sequence.

Still a further purpose of the invention is to provide a machine control including progressively operable electrical control means as a plug-in control for an automation system to be used with a working machine having electrically controlled operation-performing members and data signal means as hereinabove mentioned for running the machine through a predetermined cycle.

It is still a further purpose of the invention to provide for use with a working machine an automation system which is simple in planning.

Still a further purpose of the invention is to provide for use with a working machine a machine equipment for providing automatic electric control of the machine, the electrical wiring of which does not require the service of any person experienced in electrical circuits.

Still a further purpose of the invention is to provide an automation system for a working machine which can be applied to the machine initially on a small scale and to which additional control means can be added stage by stage without the necessity of changing any complicated electrical circuits.

Still a further purpose of the invention is to provide plug-in control for a working machine having electrically controlled operation-performing members and data signal means so that in the event of any electrical failure the plug-in control can be replaced as a unit whereby repair on the spot is avoided which otherwise would keep the automated machine out of operation for sometime.

It is a further purpose of the invention to provide an automation system for a working machine for running the machine through a programme by means of electrically controlled operation-performing means which includes means for sensing a condition which obviates one or more operations of the programme and in response to such sensing data provides for by-passing of said programme stage or stages.

Still a further purpose of the invention is to provide an automation system for a working machine to provide a programme of sequential operations by means of electrically controlled operation-performing members on said working machine which provides for the possibility of interrupting the predetermined programme during the automatic cycle carrying out an auxiliary programme and upon termination of the auxiliary programme to continue the predetermined programme.

Still a further purpose of the invention is to provide an efficient, but relatively simple and inexpensive automation system to provide sequential operation steps automatically by processing information or data from a working machine without the necessity of basing the decisions which provide the automatic control on comparison of data obtained during the programme with data previously set into the control system.

Still a further purpose of the invention is to provide a control system for a working machine having means to produce electrical information or data signals in which counting of the data signals only is provided, and command signals for electrically controlled operation performing members on the machine are derived directly from the counter.

Figure 2:
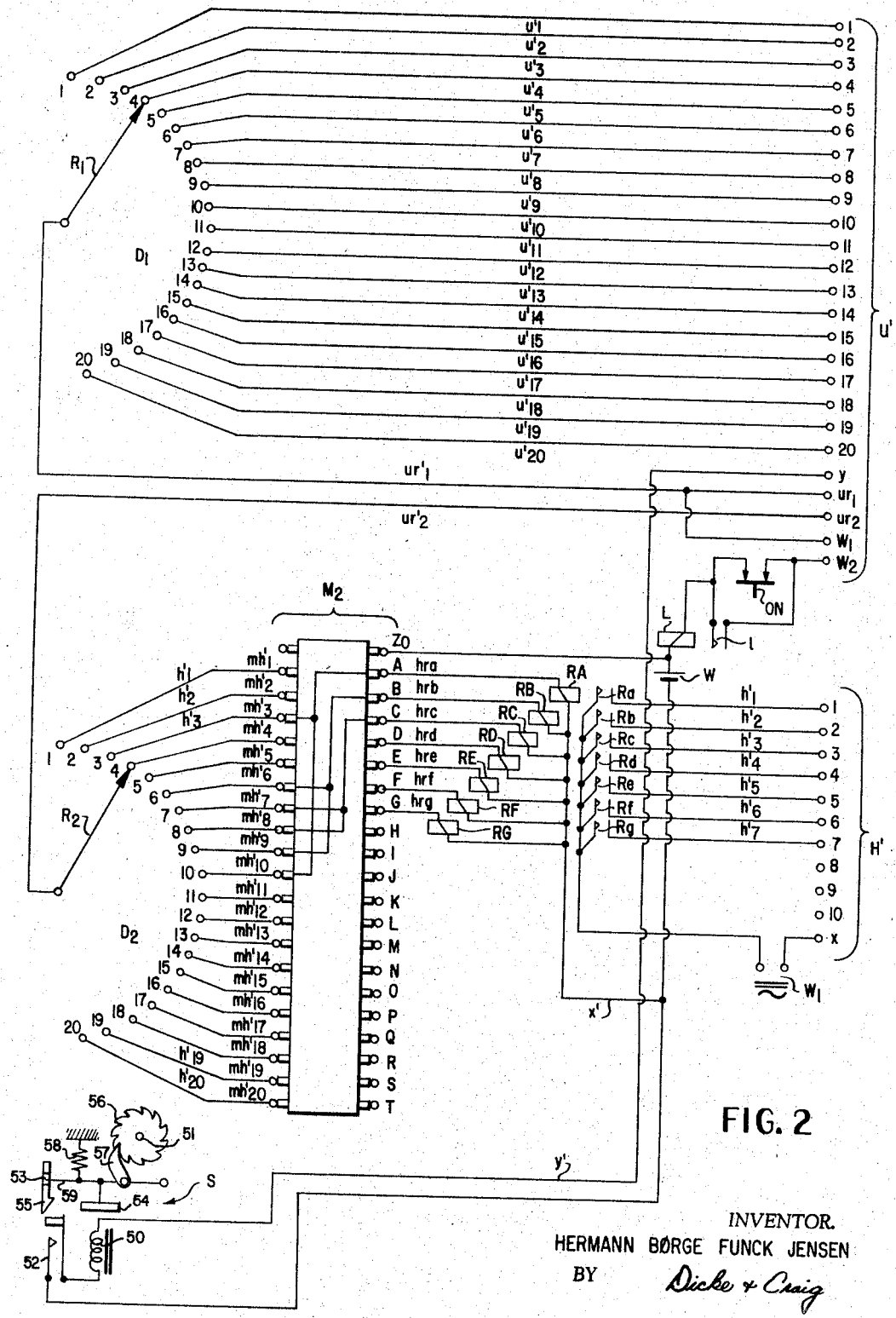
Figure 4:
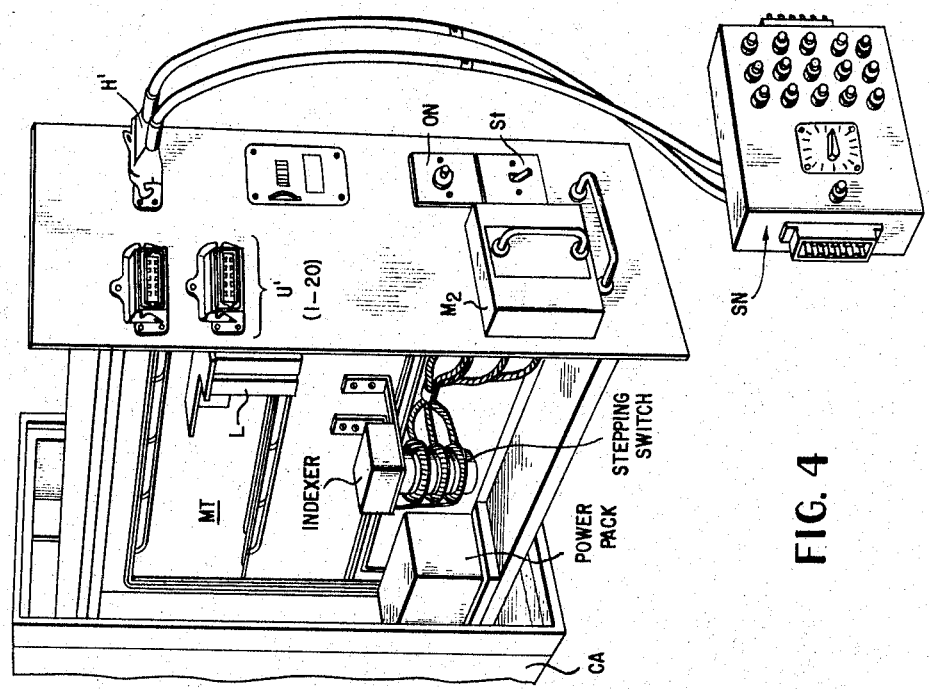
Figure 3:
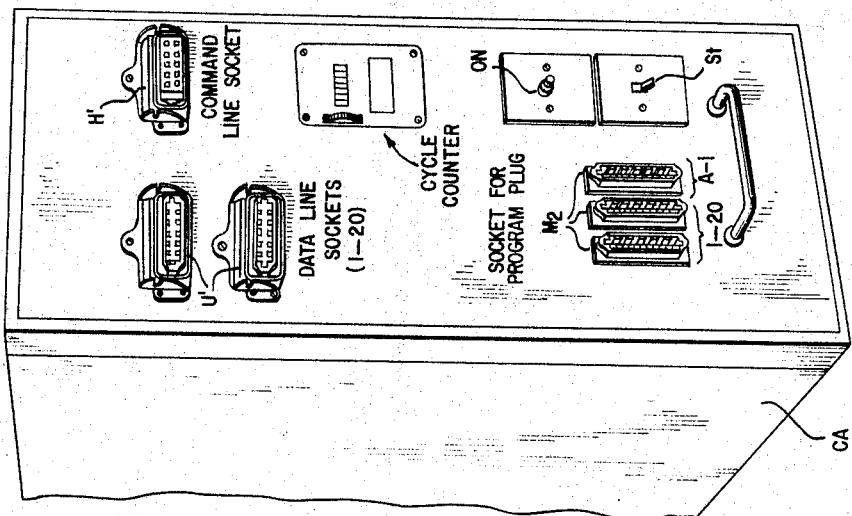
Figure 5:
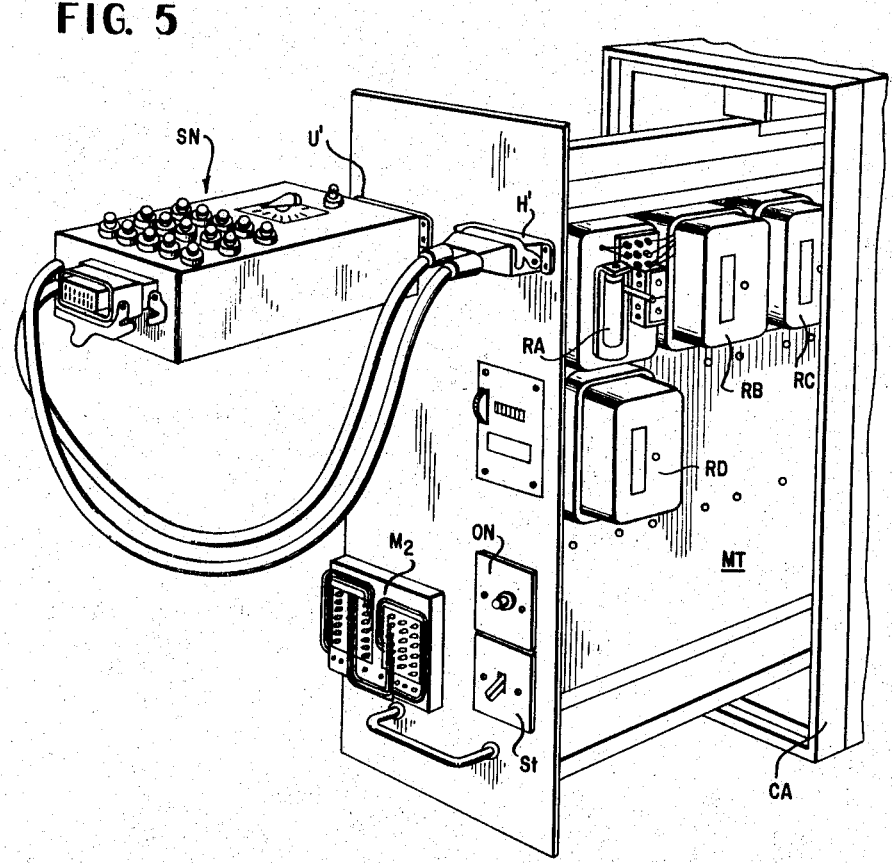
Figure 7:
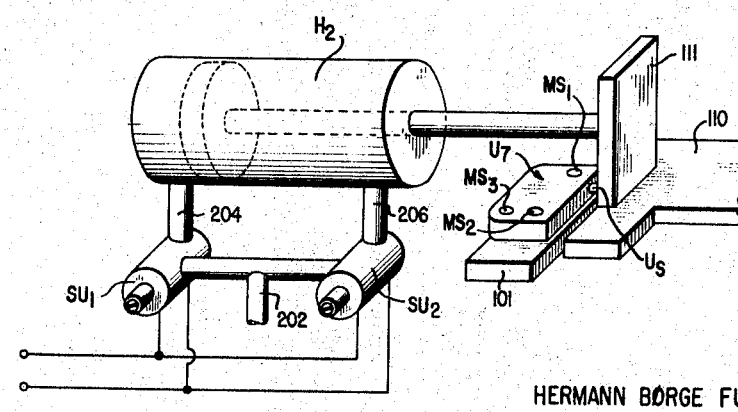
Figure 8:
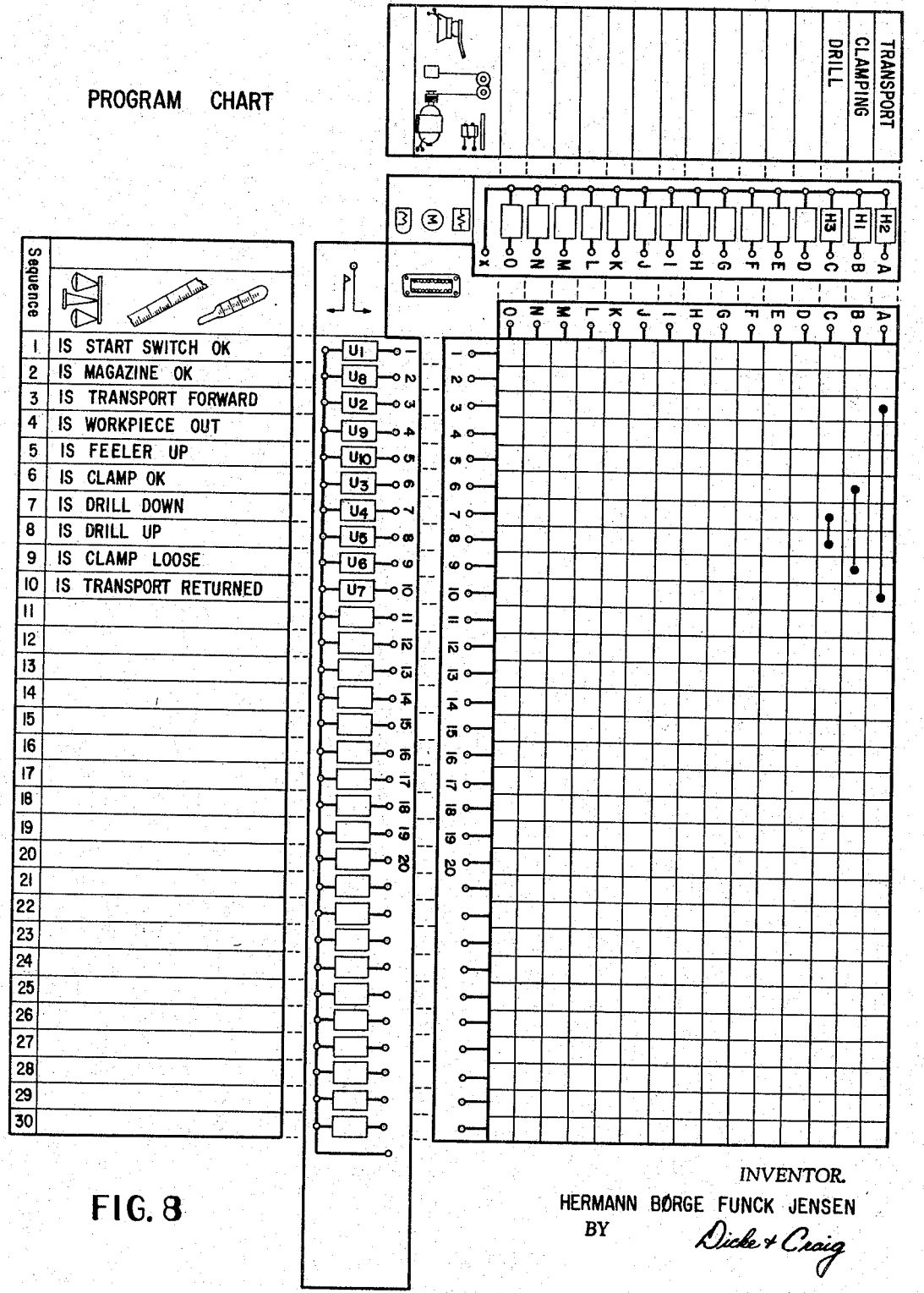
Figure 9:
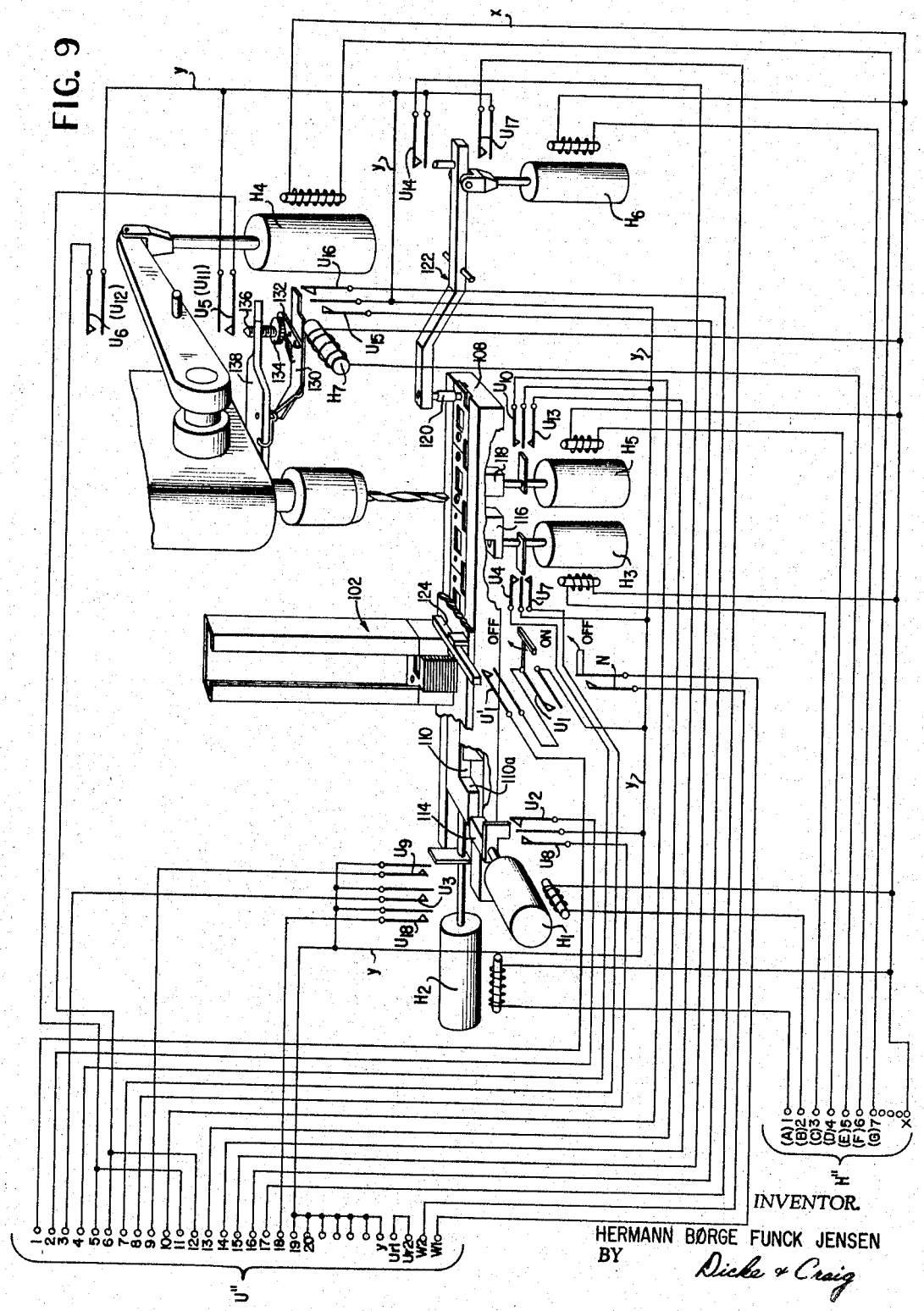
Figure 10:
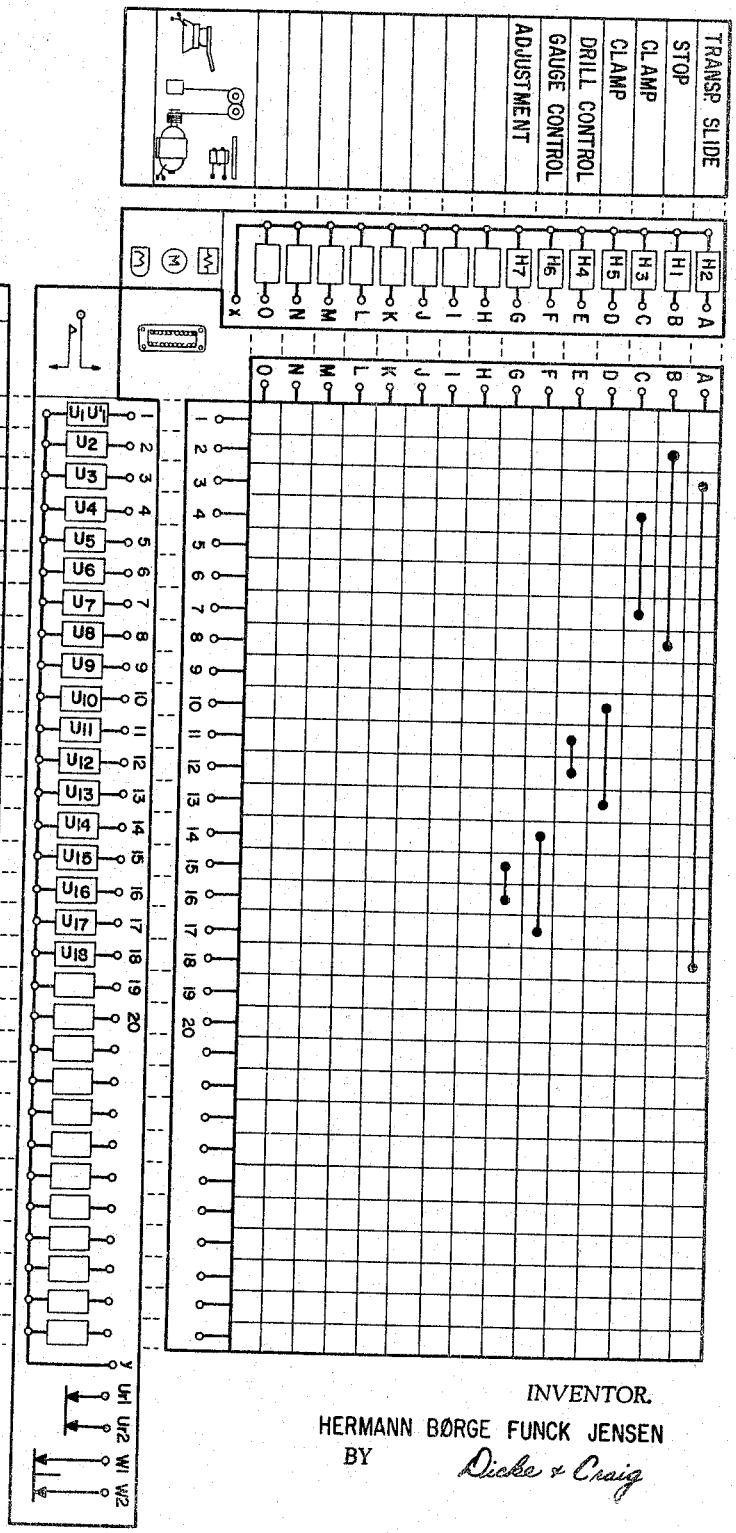
Figure 11:
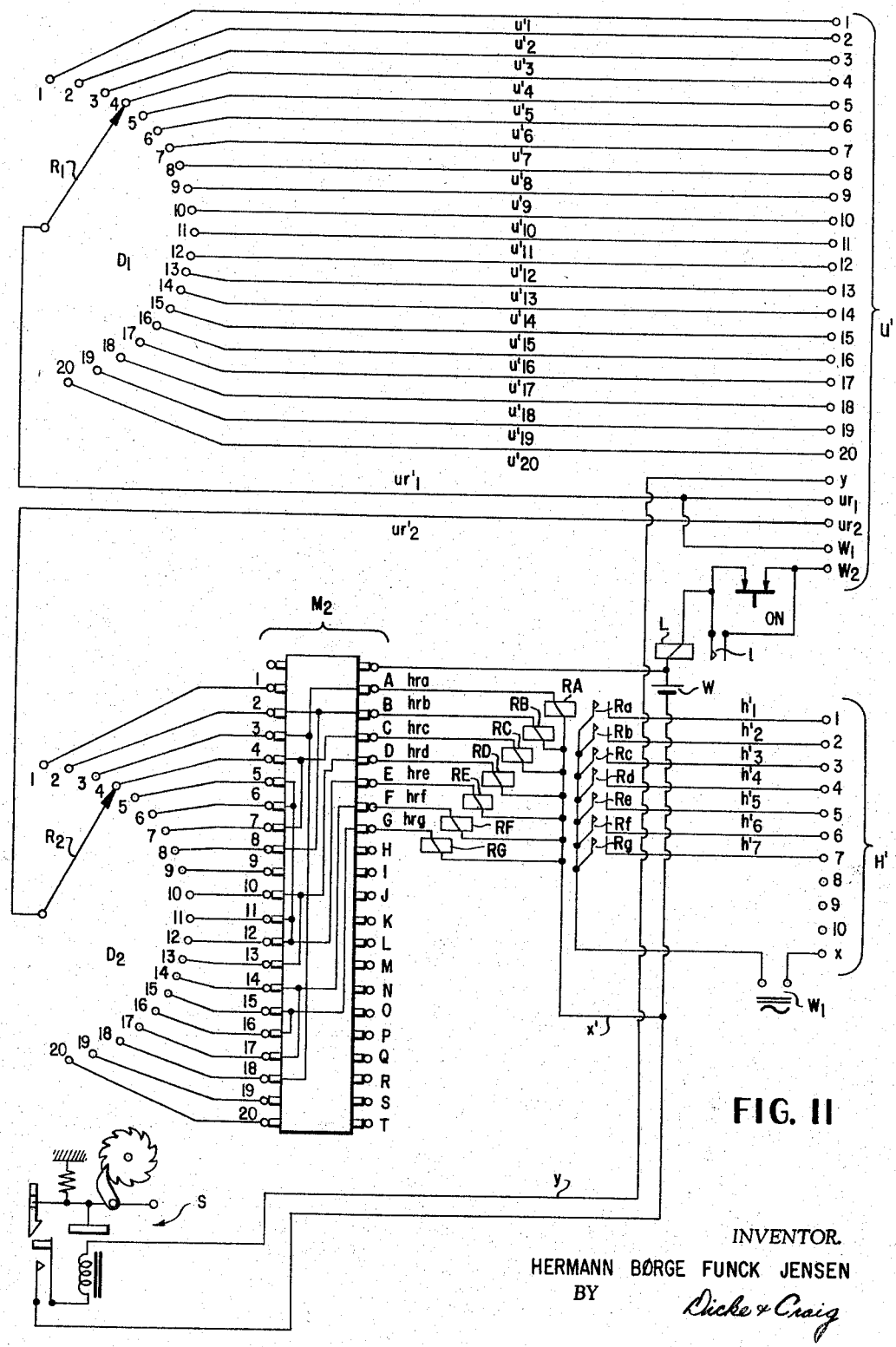
Figure 12:
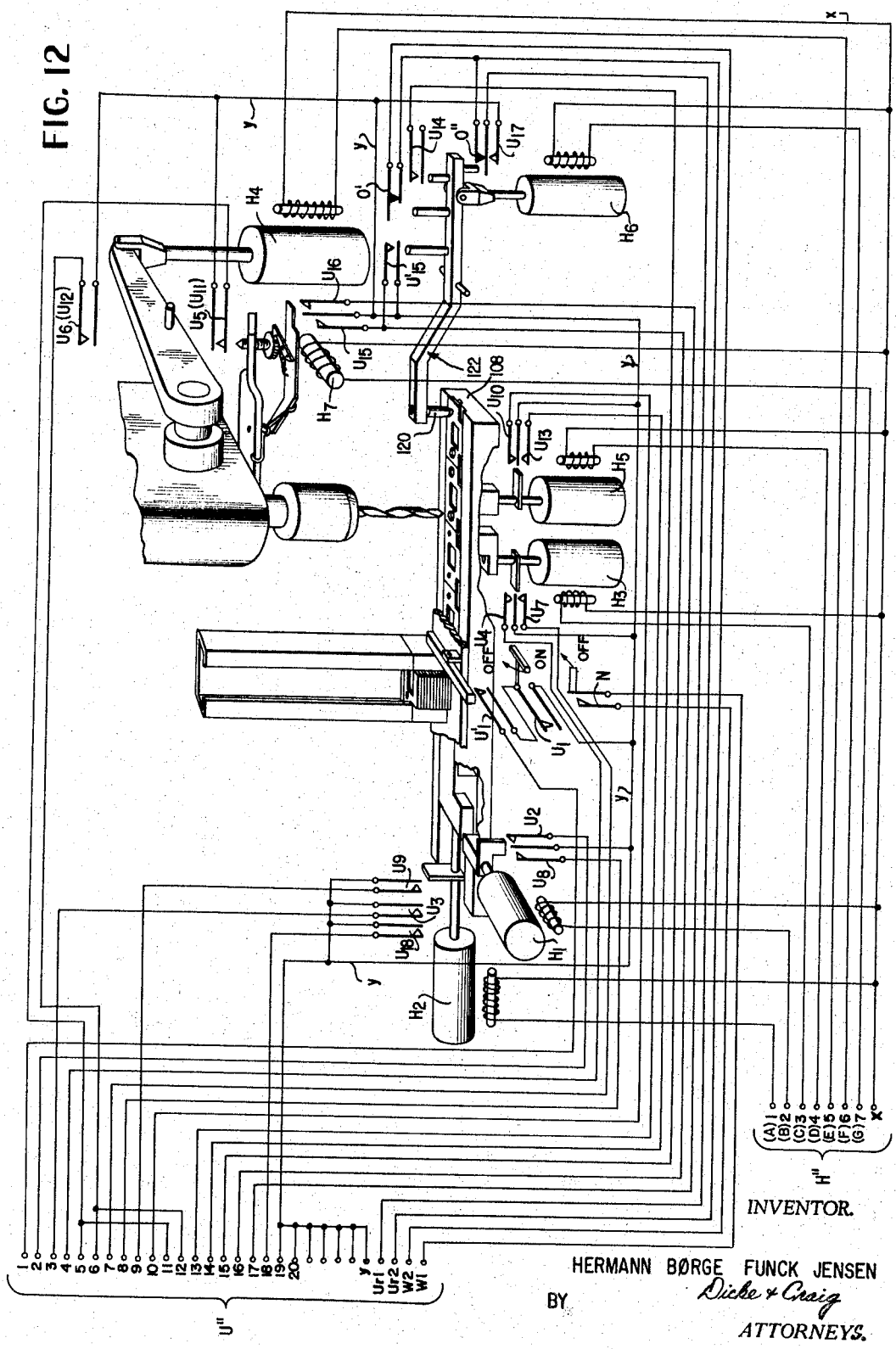
Figure 13:
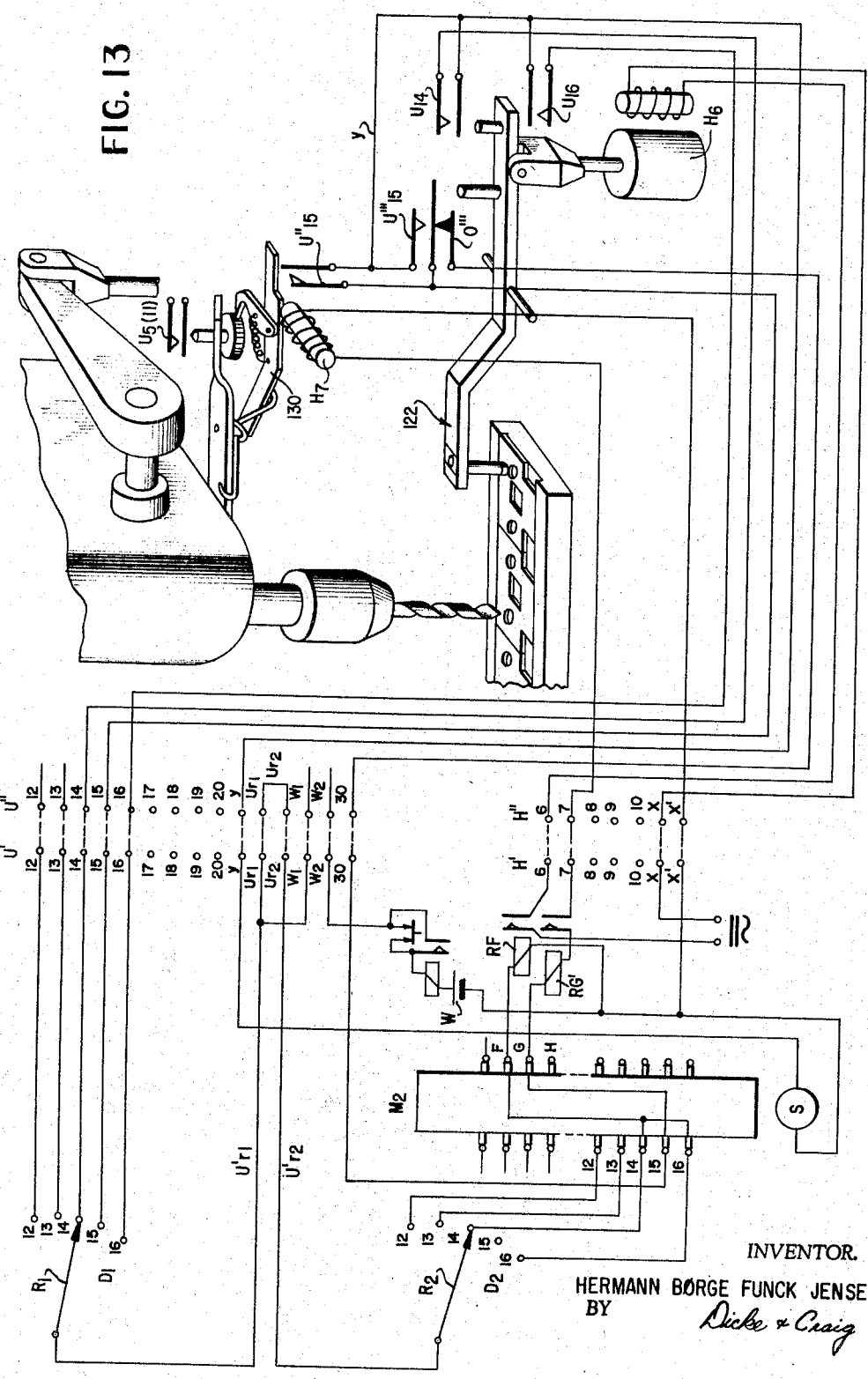
Figure 14:
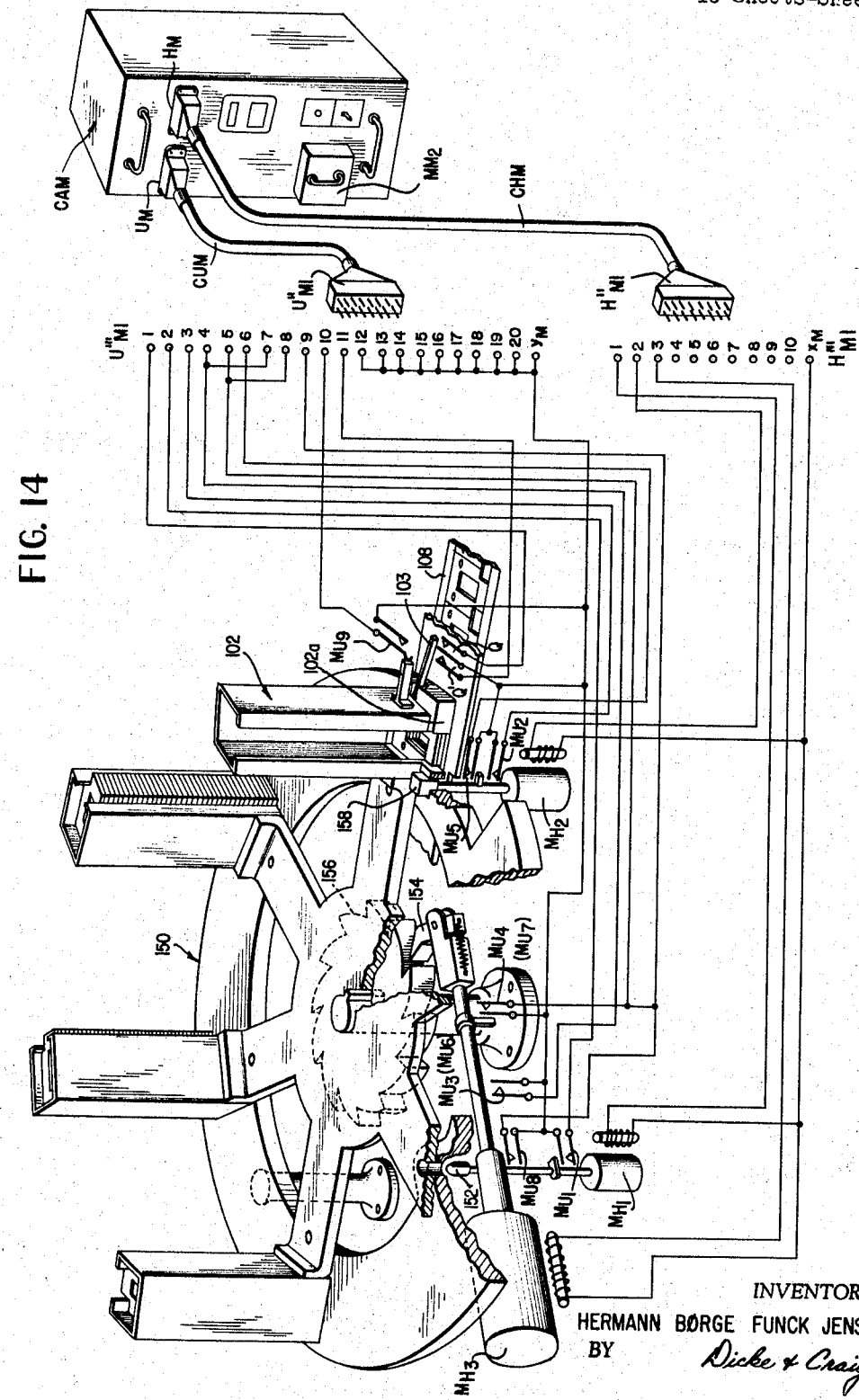
Figure 15:
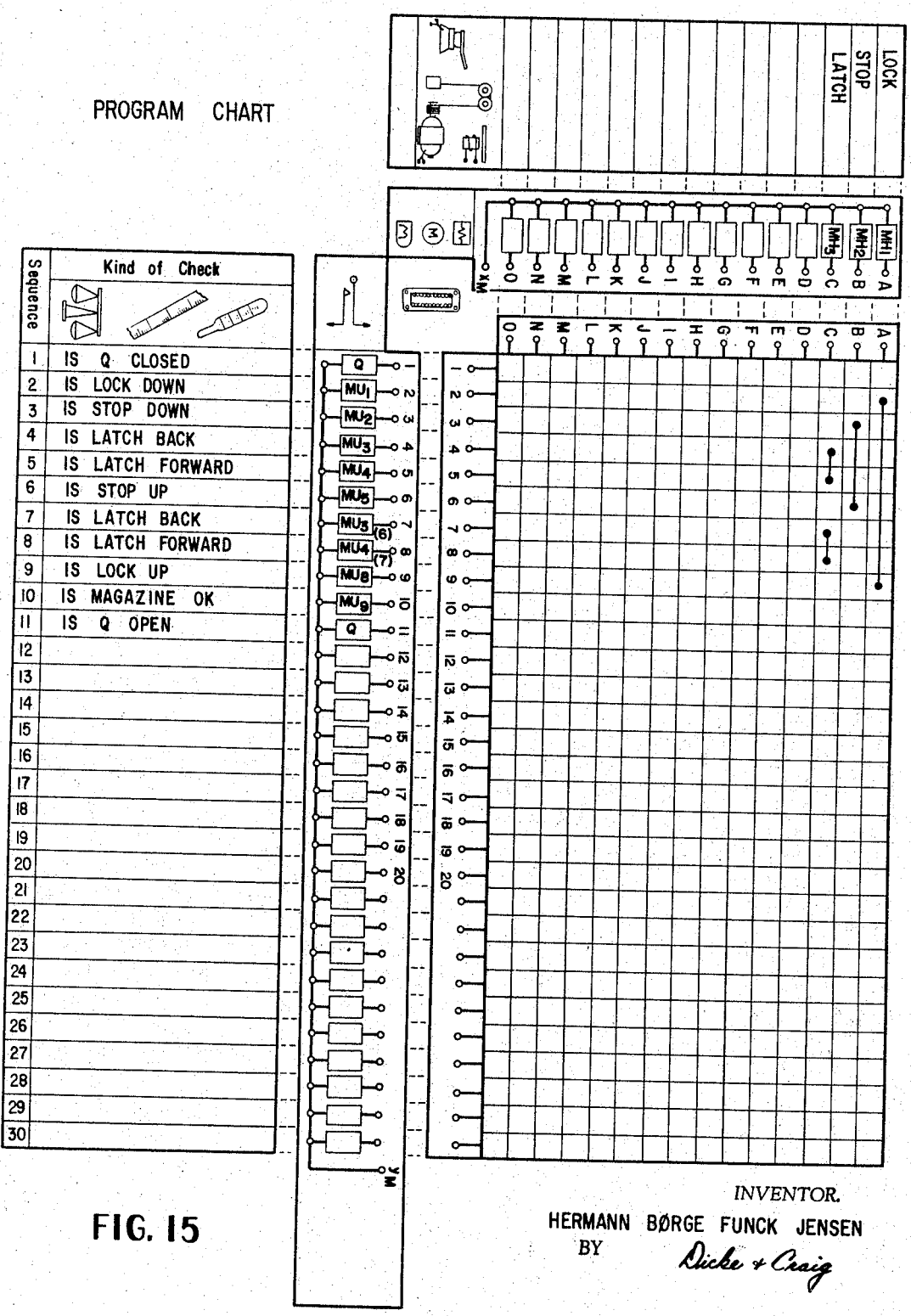
Figure 16:
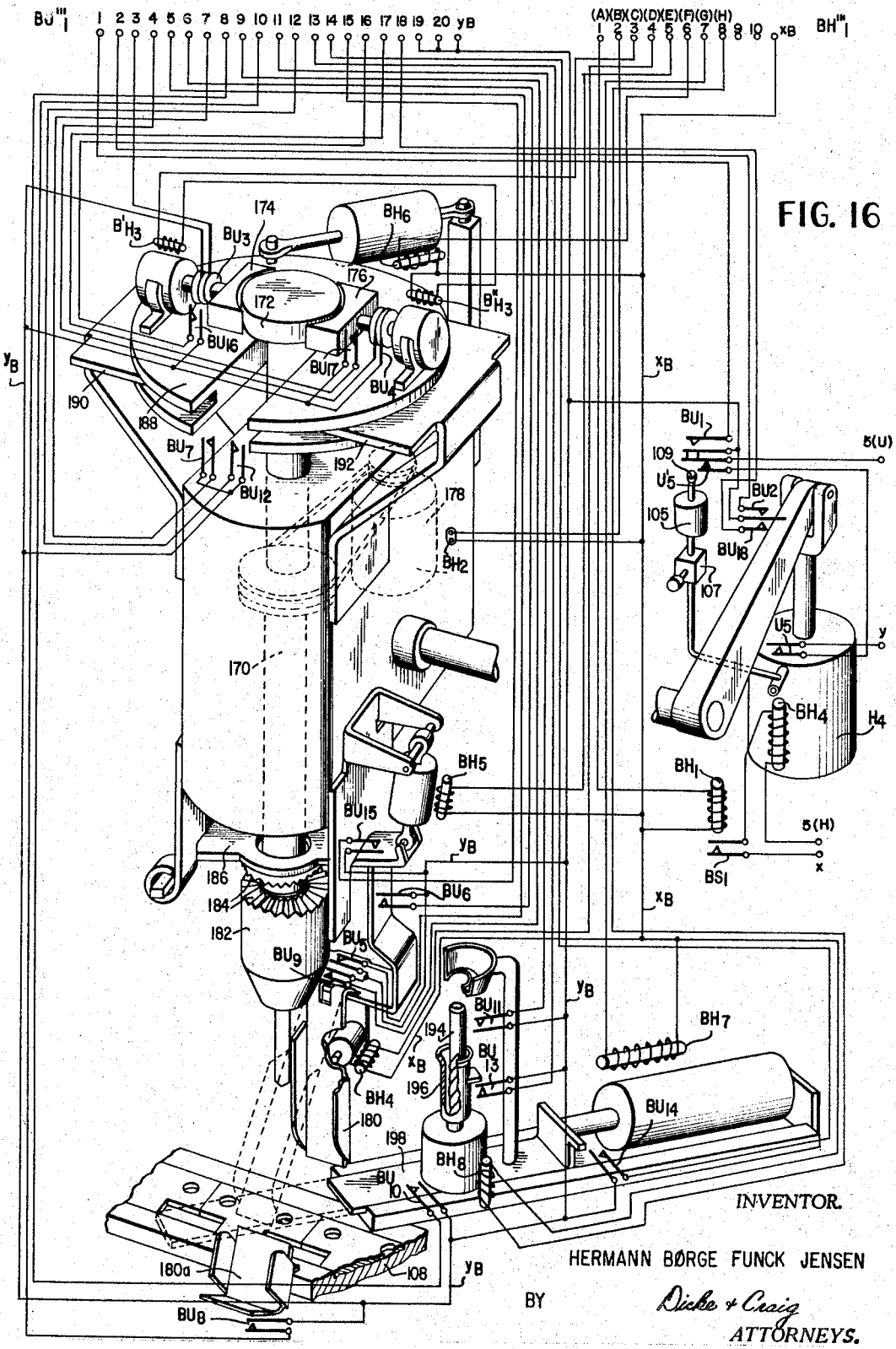

Further purposes and advantages of the invention will appear from the following description with reference to the accompanying drawing, in which FIGURE 1 is a schematic diagrammatic illustration of an automation system according to the invention, FIGURE 2 is a more specific diagrammatic illustration of a control apparatus according to the invention, FIGURE 3 is a perspective front view of a control apparatus according to the invention, FIGURE 4 is a perspective view of the apparatus shown in FIGURE 3, showing the arrangement of certain of the components and illustrating a connection with a safe starter network, FIGURE 5 is a perspective view of the apparatus shown in FIGURE 3, showing the arrangement of other components and a modified connection with the safe starter network, FIGURE 6 is a schematic illustration of a simple machine equipment for use with a control apparatus as shown in FIGURE 2, FIGURE 7 is a schematic illustration of a part of the equipment used on the machine shown in FIGURE 6, FIGURE 8 is a programme chart for the machine equipment shown in FIGURE 6, FIGURE 9 is a schematic illustration of a more complex machine equipment for use with a control apparatus as shown in FIGURE 2, FIGURE 10 is a programme chart for the machine equipment shown in FIGURE 9, FIGURE 11 is a diagrammatic illustration of the control apparatus wiring according to the programme chart shown in FIGURE 10 for running the machine shown in FIGURE 9 through an automatic cycle, FIGURE 12 is a modification of the machine shown in FIGURE 9 illustrating the possibility of bypassing a machine function, FIGURE 13 is a modification of the machine shown in FIGURE 12 illustrating a part of the machine and a part of the control apparatus and showing the possibility of including the machine function bypassed according to FIGURE 12 as an extra machine function, FIGURE 14 is a part of the machine shown in FIGURE 6 illustrating the possibility of including an auxiliary programme to be controlled by means of an auxiliary control apparatus, FIGURE 15 is a programme chart for the auxiliary equipment shown in FIGURE 14, FIGURE 16 is a schematic illustration of a further auxiliary machine equipment to be used with the machine shown in FIGURES 9 or 12 illustrating a further possibility of adding auxiliary functions to the machine programme to be controlled by an auxiliary control apparatus.

Figure 17:
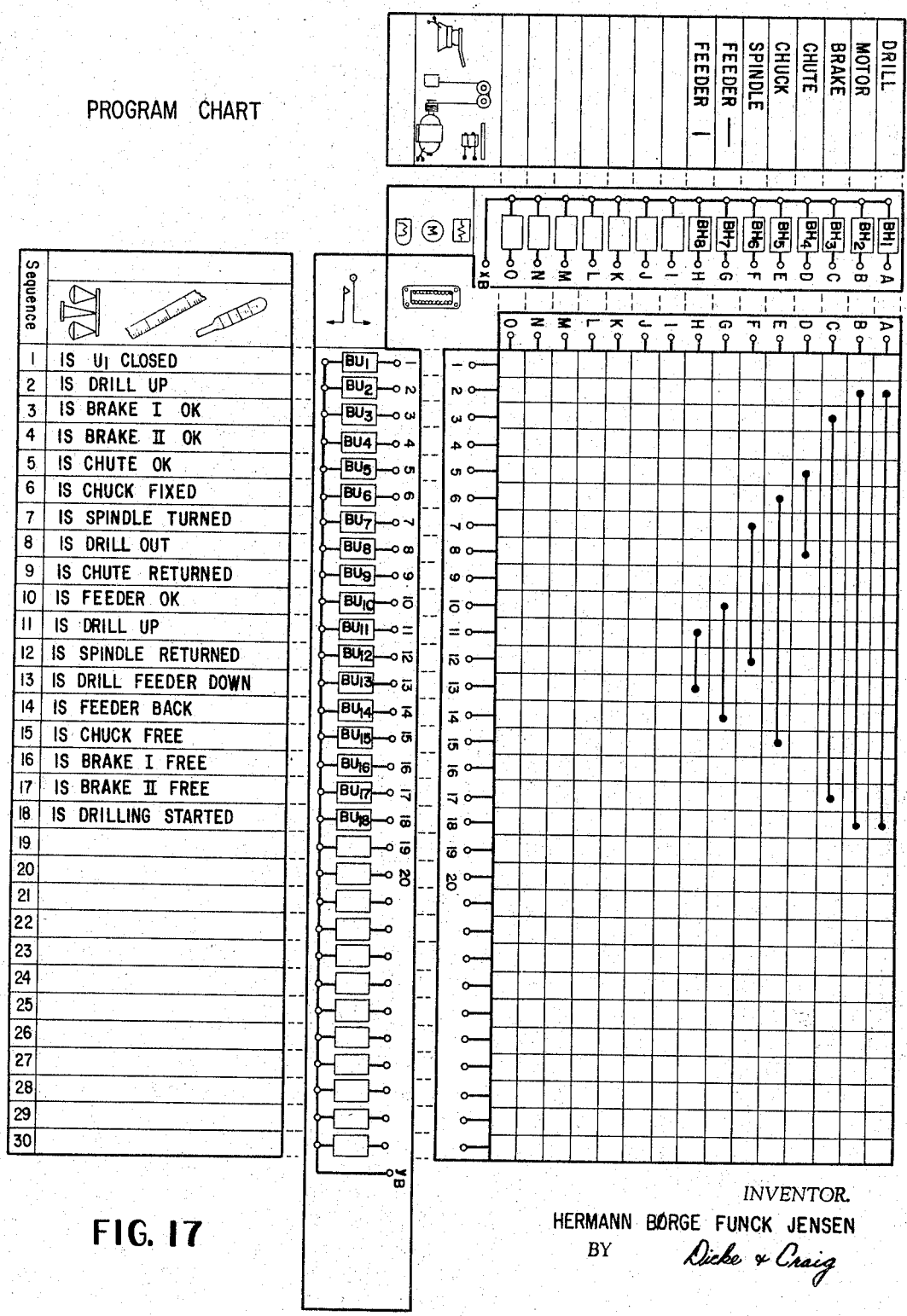
Figure 18:
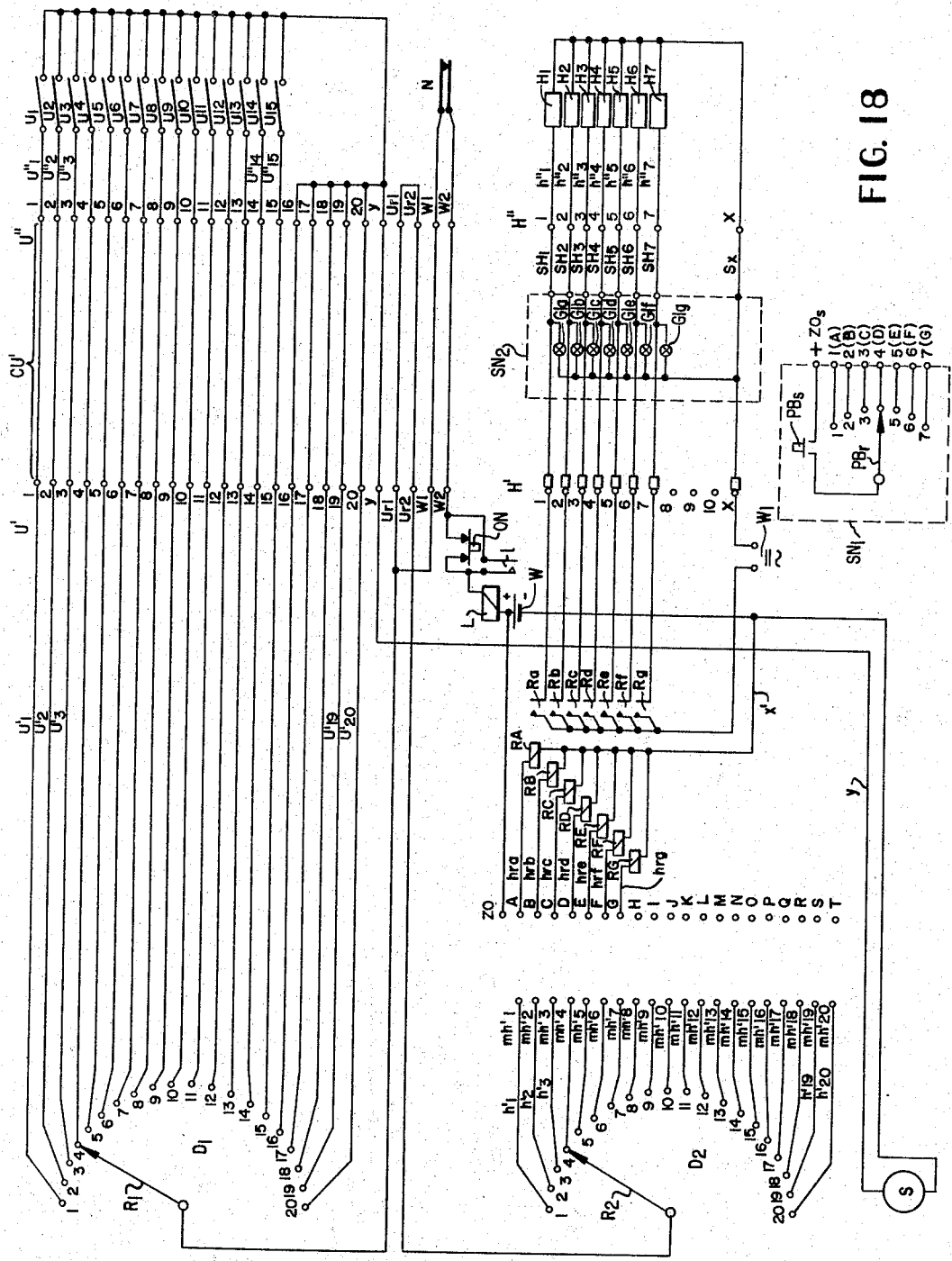
Figure 19:
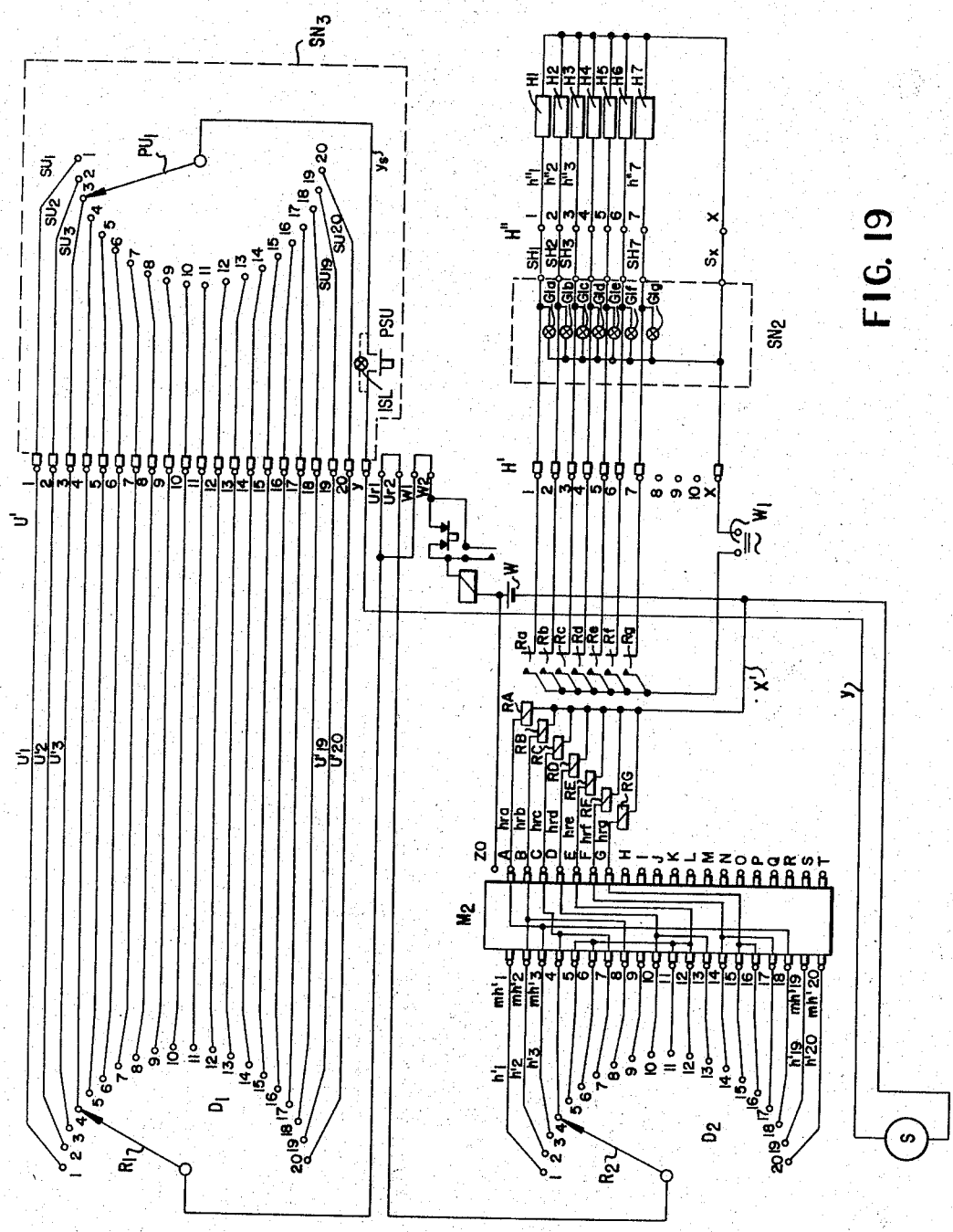

FIGURE 17 is a programme chart for the auxiliary machine equipment shown in FIGURE 16, FIGURE 18 is a diagrammatic illustration of the control apparatus and the machine equipment in combination with an auxiliary network, FIGURE 19 is a diagrammatic illustration of the control apparatus and a part of the macine equipment in combination with a modification of the auxiliary network shown in FIGURE 18, FIGURE 20 is a diagrammatic illustration of the control apparatus and the machine equipment in combination with a further modification of the auxiliary network, FIGURE 21 is a block diagram illustrating the basic functions and features of a system according to the invention, and FIGURE 22 is a simplified diagram illustrating the basic functions and features of the system according to the invention by symbolic logic circuitry.

In FIGURE 1, $A_2$ is a working machine having a plurality of electrically controlled operation performing members $H_1$, $H_2$, $H_3$ . . . and a plurality of data signal means $U_1$, $U_2$, $U_3$, $U_4$, $U_5$, $U_6$, $U_7$ adapted to produce data signals. Reference character U designates an electrical sequence control apparaus which includes means within the box in dash lines and generally referred to by R which effectively provides a plurality of stages and which may be referred to as a progressive switch arrangement or as a counter device, because as will appear from the following it counts or provides digital counting of the data signals only. The control means R is operatively connected by means of a plurality of circuit lines $h'_1$, $h'_2$, $h'_3$ . . . and $h''_1$, $h''_2$, $h''_3$ . . . operatively connected with the operation performing members $H_1$, $H_2$, $H_3$ . . . and is operable to actuate these members in a predetermined sequence. Furthermore, means generally referred to as S is provided operable to switch the control means R. Said switch means S is operatively connected by means of a plurality of circuit lines $u'_1$, $u'_2$, $u'_3$ . . . and $u''_1$, $u''_2$, $u''_3$ . . . of a second group with the data signal means $U_1$, $U_2$, $U_3$ . . . to provide the switching of the control means R exclusively in response to data signals from the data signal means upon receipt of said data signals in predetermined time relationship.

More specifically the automation equipment to be used on the working machine $A_2$ to enable the machine to be automatically run through a cycle comprises the plurality of electrically controlled operation control means or operation performing members $H_1$, $H_2$, $H_3$ . . . on the machine adapted to effect a plurality of machine functions. Each of said operation control means $H_1$, $H_2$, $H_3$ . . . is included in a circuit line $h''_1$, $h''_2$ and $h''_3$ of first electrical circuit means, the circuit lines of which extend to identifiable terminal points of a first one of a pair of complementary electrical connecting parts H'', for example a socket having a plurality of terminals. The machine equipment furthermore includes a plurality of electrical data signal means $U_1$, $U_2$, $U_3$ . . . on the machine adapted to produce data signals correlated to machine functions. The data signal means $U_1$, $U_2$, $U_3$ . . . are each included in a circuit line $u''_1$, $u''_2$, $u''_3$ . . . of a second plurality of circuit lines which extend to identifiable terminal points of another of complementary electrical connecting parts U'', for example a second socket having a plurality of terminals.

As appears from FIGURE 1, the operation control means $H_1$, $H_2$, $H_3$ are individually connected in each of the lines $h''_1$, $h''_2$, $h''_3$, these lines being connected to one side of the control means. The other side of the control means $H_1$, $H_2$, $H_3$ are connected together and to a common line $x''$. In a corresponding manner the data signal means $U_1$, $U_2$, $U_3$ . . . which are exemplified by means of electrical switches all have one side individually connected to each of the lines $u''_1$, $u''_2$, $u''_3$ and their other sides connected together and to a common line $y''$.

The control means may, for example on a machine tool, be in the form of electrical actuators such as solenoid valves for controlling the flow of pressure fluid to pneumatic or hydraulic cylinders having movable pistons operatively connected with the members of the machine tool for moving said members, clamping a workpiece, advancing a clamped workpiece to a machining position, etc.

In other cases the control means $H_1$, $H_2$, $H_3$ may be electrical apparatuses such as electrical motors adapted to drive parts of a working machine, speed controls for such motors, or the control means may, in the event that the working machine is a chemical plant, be in the form of electrical heaters or electrical actuators for valves in pipelines. As will be understood, the control means $H_1$, $H_2$, $H_3$ may comprise any power-converting and actuating means which drives the process machinery of the working machine including any auxiliary machine equipment added to the machine for enabling automatic control thereof.

The data signal means which is shown by way of example as switches may on a machine tool be in the form of sensing switches in the machine to be actuated in a predetermined sequence which represents an expression of the machine data during the machine cycle. The data signal means may, however, depending on the character of the working machine, be in the form of any devices for sensing variable such as temperature, pressure, vibration, humidity, speed, time, etc. and being able to produce data signals responsive to such sensing.

Irrespective of the fact whether the data signal means are simple mechanically actuated switches mounted on a machine tool to be closed to provide a data signal to indicate an end position of a movable member of the machine tool or the data signal means is in the form of an electronic instrument used as a sensing device to provide a data on any complex part of the machine process, the construction of the machine equipment as illustrated in FIGURE 1 is a simple answer to the problems, because it enables the machine equipment to be constructed independently of the control apparatus and does not require any personnel experienced in electrical circuits, since the connection of one side of all the control means or electrical actuators to a common line and the other side of each of the actuators to a separate line does not require any specific knowledge of electrical circuits. Neither does it require any specific skill to connect one side of all the data signal means or sensing switch devices to a common line and all the other sides of each sensing switch or device to an individual line and thereafter connect these two groups of lines to the correct ones of the identifiable terminal points of the connector sockets or the like.

This has the advantage that by the construction of a machine equipment, for example on a machine tool, the workshop is relieved from all complex electrical wiring. The construction only requires mounting of the hydraulic and/or pneumatic cylinders to replace the manual control of the machine and in addition thereto mounting of the appertaining solenoid valves or the like. In addition the sensing switches have to be mounted in position to be actuated, for example on completion of each function such as clamping functions, forward transport of the workpiece, etc. in such a manner that if a function commanded electrically is not performed mechanically, the switch is not actuated.

In the control apparatus the means S operable to switch the progressive switch arrangement and which also may be referred to as "staging member" or "indexing member" is, in order to exclusively provide the switching or indexing in response to data signals, included in one group of data signal lines comprising a common line $y'$ and a plurality of individual lines $u'_1$, $u'_2$, $u'_3$ . . . which are rendered operable in sequence as data signal lines by means of the progressive switch arrangement or counter device. These groups of lines of which each of the lines $u'_1$, $u'_2$, $u'_3$ . . . includes the progressive switch arrangement or counter device at a predetermined one of their stages only extend together with the common line $y'$ to identifiable terminal points of one complementary electrical connecting part U′ of the control apparatus, for example a socket to provide plug-in connection with the corresponding group of data signal lines $u''_1$, $u''_2$, $u''_3$ . . . of the machine equipment.

In the control apparatus U the progressive switch arrangement R is furthermore included in a second group of separate lines $h'_1$, $h'_2$, $h'_3$ . . . each of which includes the progessive switch arrangement only at one stage, be rendered effective as a command signal line at the respective stage, a common return line $x$. Also the second group of lines $h'_1$, $h'_2$, $h'_3$ . . . extends to identifiable terminal points of a complementary electrical connecting part H′ of the control apparatus to be connected with the corresponding command signal lines $h''_1$, $h''_2$, $h''_3$ . . . of the machine equipment by being plugged in. For both plug-in connections cables CU′ and CH′ may be used having at each end complementary electrical connecting parts such as plugs having a number of terminals corresponding to the number of terminals of the sockets of the control apparatus and the working machine equipment and, of course, with the cable wires connected to respective corresponding plug terminals at both ends.

The use of this plug-in control has a plurality of advantages. As mentioned hereinbefore the construction of the electrical wiring of the machine equipment does not require any skill with respect to complex electrical circuits. The more complicated circuits are included in the control apparatus. This means, when using my system in actual production to run the machine automatically through a cycle, that in the event of an electrical failure the control apparatus can be disconnected as a unit and a new control apparatus can be plugged in. Accordingly, no repair on the spot is necessary which would keep the automated machine out of operation for a period which usually is the case when complicated electric control apparatuses break down, because the repair of such apparatuses including fault finding requires a service of an expert who is not always readily available.

The complete automatic control of a working machine is rather complicated to plan and usually requires a substantial experience. The system according to my invention, however, enables an initial automatic control of certain operations of a programme with the possibility of gradually adding further sensings to provide data signals and further machine function members on the machine equipment and still use the same control apparatus, whereby substantial versatility is provided, as will appear from the following.

The progressive switch arrangement or counter device is in FIGURE 1 shown as a simple stepping switch having two decks $D_1$ and $D_2$ with movable indexing fingers $R_1$ and $R_2$ movable in synchronism by means of the indexing device S so as to sequentially be indexed from one position to the next following position, whereby the finger $R_1$ scans the data signal lines in sequence and thereby sequentially renders the data signal lines operable to transmit a data signal, while the finger $R_2$ scans the command signal lines in sequence and thereby renders the command signal lines sequentially operable to transmit a command signal.

In order to provide energization of the switching means S as well as that one of the two groups of data signal lines and command signal lines respectively, which is rendered operable at each stage of the progressive switch arrangement, a voltage source W, for example a battery, is connected at one side to the common line $x$ of the command signal circuit group as well as to one side of the indexing means S, and with the other side to the two movable fingers $R_1$ and $R_2$. The other side of the indexing means S is connected to the common lines $y'$ of the data signal circuit group. As will be understood from FIGURE 1, this enables the indexing or advancing of the progressive switch arrangement R to be caused only in response to closing of the data switches. In addition, the indexing from a stage number $n$ to stage number $n+1$ can only be caused by closing of that data switch which is included in the respective data signal line $U_n$, and closing of that data switch $U_n$ will always cause and cannot cause any other indexing of the switch arrangement than to stage $n+1$.

This means that the progressive switch arrangement operates as a counter device and provides counting of the data signals only, with each counting stage being a non-ambiguous expression of the sum of data signals which precedes a respective stage.

Seen from another aspect this means that because a data signal line is only able to transmit a data signal which results in indexing of the computing switch when it is rendered effective at the respective stage, the counter only renders the data signals available as indexing signals in digital sequence of the counter, or in other words, the data signals can only be fed into the counter device to provide indexing thereof if they are produced in digital counting sequence.

Since the data signals only can be converted into numerical steps of the counter device when they are produced in the same numerical sequence as the stages of the counter device, this means that the only necessary pre-planning of the automation system consists in making an analysis of the actual sequence in which the data signals are produced during the cycle of the working machine. This is a relatively simple planning and once this has been made, the number sequence of the data signal lines is fixed, and the only requirement with respect to these lines is that they must be connected to the respective identifiable terminal points of the socket U″ or the like on the machine equipment.

My invention enables this analysis to be the only requirement with respect to the planning on the machine side. The control means $H_1$, $H_2$, $H_3$ . . . may be connected to the terminal points of the other socket or the like H″ in any arbitrary sequence. In such event distributor means $M_2$ is included, preferably in the control apparatus U in the connecting circuit means $h'_1$, $h'_2$, $h'_3$ . . . which define the command signal lines in the form of suitable electrical cross-connection means for effectively applying the command signals to the operation performing members in the desired predetermined sequence correlated to the stages of the counter device to provide the desired predetermined cycle of machine functions. The distributor means $M_2$, (the wiring of which will be described later), is preferably in the form of an interchangeable plug having an opposite plurality of terminals, adapted to be inserted in a complementary socket having opposite terminals $mh'_1$, $mh'_2$, $mh'_3$ . . . on one side and $mh''_1$, $mh''_2$, $mh''_3$ . . . on the other side and being interposed in the command circuit lines $h'_1$, $h'_2$, $h'_3$.

By suitable numbering of the terminals of the distributor plug $M_2$ and use of a programme chart as shown in FIGURE 8, the analysis of the sequence in which the data signals are produced during the operation cycle of the machine can be used to facilitate the wiring of the distributor plug to secure the correct stage-responsive sequential selection of the command signal lines of the machine to be rendered operative so as to correlate the transmission of command signals correctly to the data-responsive stages.

Hereby the progressive switch arrangement or counter device performs the double function of providing counting of the data signals only and stage-responsive or numerical programming of the operations.

Seen from another aspect the sensing or information signal circuit system of FIGURE 1 includes a plurality of information signal lines or circuit means $u'_1$, $u'_2$, $u'_3$ . . . each of which includes one of the sensing switch means and a respective corresponding stage of the progressive switch arrangement. Hereby, it is a condition for the actuation of the staging member or indexing member S that the progressive switch arrangement R is at a predetermined one of its respective stages and that the respective corresponding sensing switch is actuated. In other words, seen from the indexing member each information signal line is in the form of an "AND-gate" or "coincidence-gate" which requires the simultaneous fulfilment of the two conditions, namely the establishment of a connection and a respective stage through the progressive switch arrangement and establishment of connection at the same stage through the sensing switch means upon actuation thereof.

As a simple example it will now be supposed that the sensing switches $U_1$, $U_2$ . . . and the machine function members $H_1$, $H_2$, and $H_3$ are functionally related to a machine tool as follows:

The switch $U_1$ is a starter switch and the switch $U_2$ is closed in response to forward transport of a workpiece effectuated by means of the machine function member $H_1$. The switch $H_3$ is a switch closed in response to clamping of the workpiece in position for machining, the clamping being effectuated by the machine function member $H_2$. The switch $U_4$ is closed in response to the termination of the machining operation which is performed by the member $H_3$. The switch $U_5$ is closed in response to the return of the machining member to its inoperative position wherafter the switch $U_6$ is closed in response to the termination of the clamping, and the switch $U_7$ is closed in response to return of the forward transporting member to its initial position.

It will be understood that with the cross connections of the distributor member $M_2$ shown in full lines in FIGURE 1 and starting with the progressive switch arrangement at stage number 1, the mode of operation will be substantially as follows:

Upon closing of the starter switch $U_1$ at stage number 1 the simultaneous condition is fulfilled and the progressive switch is advanced or indexed to stage number 2. At this stage the cross connection between the distributor terminals $mh'_2$ and $mh''_1$ renders the command signal line $h''_1$ in the machine equipment effective to transmit a command signal to actuate the machine function member $H_1$ whereby the workpiece is forwarded. In the correct operation position of the workpiece the switch $U_2$ is closed and indexes the progressive switch arrangement to stage number 3 which renders the command signal line $h''_2$ effective to actuate the function member $H_2$, i.e. to provide the clamping of the workpiece. The check on correct clamping is the closing of the switch $U_3$ which stages the progressive switch arrangement to stage number 4 in which the machining member $H_3$ is rendered effective.

Upon termination of the machining the sensing switch $U_4$ is closed and advances the progressive switch arrangement to stage number 5.

Assuming that the machine function members automatically are returning to their neutral or inoperative position, the returning of the machining member $H_3$ to this inoperative position closes the switch $U_5$ which causes the progressive switch arrangement to be advanced to stage 6, in which the returning of the clamping means $H_2$ to its inoperative position closes the switch $U_6$ and thereby advances the progressive switch arrangement to stage number 7. At this stage the returning of the workpiece transport member $H_1$ to its inoperative position causes the closing of the sensing switch $U_7$ which fulfils the cycle and resets the progressive switch arrangement to stage 1. If at that stage the starter switch $U_1$ is still closed, the cycle will be repeated.

It will be understod that a similar mode of operation can be used with any machine. By way of example the function member $H_1$ may be an electrically controlled valve in a pipeline through which a medium is supposed to flow or which should be closed. In such event the sensing switch $U_2$ may be adapted to sense the correct opening or closing of the valve.

It is not necessary that the switches or sensing devices operate in response to the completion of a machine function. By way of example one of the switches may be a thermal switch which is closed when the temperature of a fluid has reached such a desired value that it is a prerequisite for allowing start of the next process. In the case of a fluid flowing through pipe-lines it is also possible that one of the switches is included in a measuring device to provide a signal in response to sensing of the passage of a predetermined amount of fluid through the line.

It will be understood that these possibilities are mentioned as examples only and that numerous applications of the control system within a plurality of different technical fields can easily be designed by those skilled in the art by combining appropriate sensing devices and process control members or machine function members.

With reference to the foregoing machine tool example it will be understood that it is a prerequisite for the machining operation that the clamping of the workpiece is maintained during the machining process.

Therefore the arrangement preferably includes means operable to maintain the machine function during a plurality of stages of the progressive switch arrangement. Such maintaining means may be in the form of time delay means for the automatic return of the clamping member $H_2$ to its inoperative position. Such time delay means would, however, have to be adapted to maximum machining process time to provide safety against premature loosening of the workpiece. This again causes a time delay before the progressive switch arrangement is advanced to its next following stage.

For this reason and to avoid such delay I prefer to include in the arrangement means operable to initiate a machine function at a first stage and to terminate the machine function at a second stage and function maintaining means operable between said stages. This may be achieved by including with the machine function members means for rendering them self-holding so as to first be activated in response to receipt of a command signal and be maintained activated in response to receipt of a command signal.

By including this feature with the machine function members $H_1$, $H_2$, $H_3$ in FIGURE 1 instead of automatic return the return of the machine function members to their inoperative position can be provided by additional connection in the distributor member $M_2$ as shown in dotted lines. In such event the machining member $H_3$ which was rendered effective at stage number 4 will be rendered ineffective at stage number 5. When thereafter the progressive switch arrangement is indexed to stage number 6, the clamping means $H_2$ will be rendered ineffective and at stage number 7 the transport means $H_1$ will be rendered ineffective.

The arrangement shown in FIGURE 1 is a schematic arrangement only which serves the purpose of illustrating and explaining the basic features of the invention.

In reduction to practice I have found it convenient to include with the control apparatus different features for specific purposes to be described further in the following. A practical embodiment of a plug-in control apparatus will now be described with reference to FIGURE 2.

The apparatus is supposed to be constructed from standard components obtaintable in the trade and includes in the embodiment shown in FIGURE 2 as a progressive switch arrangement an electromagnetically controlled selector switch of the type used in telephone plants having two decks $D_1$ and $D_2$ as in the case of the embodiment shown in FIGURE 1.

It will be appreciated, however, that the construction to be described with reference to FIGURE 2 is an example of practical reduction to practice only, and that the invention is not limited to the use of a telephone component switch having rotary wipers, but that any other type of progressive switch arrangement which operatively provides a plurality of stages at each of which input and output lines can be rendered effective can be employed within the scope of my invention.

The progressive switch arrangement illustrated in FIGURE 2 has twenty stages but may within the scope of my invention be designed with any convenient number of stages.

I have found that one advantage of my invention is the simplicity and reliability of the plug-in control in combination with versatility and a simplicity of planning the automation of a working machine according to a standard procedure which will be described in detail in the following and which is the same in the case of a relatively simple small automation job and a highly complex machinery.

The progressive switch arrangement or counter device and other parts of the plug-in control apparatus including power pack, multi-terminal sockets, cabinet, etc. are standard components which have to be included. For this reason I do not believe that the reduction of number of stages so correspond to a small automation job only is warranted and in practice I prefer to construct the control unit in a size having between twenty and thirty information signal lines and between seven and ten command signal lines, though it will be understood that the apparatus according to my invention can be constructed with any large number of signal lines to meet the requirements of automation of a complex machinery.

Though the capacity of a unit having for example twenty information signal lines and seven command signal lines as shown in FIGURE 2 may be too large for a simple automation job I have found that the simplicity in planning the automation, for example of an existing machine tool invites the industry to start initially with solving an automation problem in a relatively simple manner by means of a few machine function members and then stage by stage adding supplemental sensing devices and machine function members which would be very difficult in the case of a tailormade electronic control system which in most cases would require the service of outside consulting engineers and in the case of a plug-in control unit according to my invention having a reduced number of lines would be limited to the capacity of the control unit.

These problems will be discussed and illustrated in greater detail in connection with description of different machine equipment to be controlled by the apparatus shown in FIGURE 2.

Now more specifically with reference to FIGURE 2 the indexing means S for the progressive switch arrangement is an electromechanical device operable either to index the progressive switch arrangement one complete stage, or not to operate at all. In the case of different types of progressive switch arrangements being used within the scope of my invention other types of indexing or advancing means may be employed. It will be understood, however, that for safe operation it is important that the progressive switch must either make one complete step or no step at all, and only one step in response to each signal so as to prevent for example that a disturbing flash signal under a predetermined duration causes faulty operation.

To this purpose the indexing or advancing arrangement S is of the indirect driven type which causes the rotary wipers $R_1$ and $R_2$ to be advanced from one stage to the next following stage in response to release of an armature. Such indirect stepping switch driving arrangements are commonly known included in telephone component switches with rotary wipers and will therefore only be described briefly. The drive includes a ratchet wheel 56 firmly secured on a spindle 51 which also carries the rotary wipers $R_1$ and $R_2$ movable by a ratchet 57 which is tiltably supported on an arm 59 and by means of a spring (not shown) can come into engagement with the ratchet wheel. The arm or lever 59 is provided with an armature 54 adapted to be attracted by a driving solenoid 50 which is included in the Y-line in series with a normally closed switch 52. A reciprocable member is provided with a cam surface 55 operable in response to downward reciprocation of the member to open the switch 52. The left hand end of the lever 59 operates to reciprocate the cam member 55 downwardly to open the switch 52 when the solenoid 50 is energized. A sufficiently full stroke of the lever 59 in the armature is assured by a play 53 between the left hand end of the lever 59 and the cam member 55. The advancement of the ratchet wheel 56 is caused by a spring 58 which is connected with the lever 59 at a fixed point.

Briefly the mode of operation of this structure is as follows:

When in response to the fulfillment of the simultaneous requirement of a predetermined stage which renders an information signal line effective and the closing of that line by the operation of the respective sensing device included therein, current is drawn through the $y'$ line, the solenoid 50 is energized and attracts the armature 54 whereby the lever 59 is pivoted and initially tensions the spring 58 whereafter during further tension of the spring 58 it reciprocates the cam member 55 which causes the opening of the switch 52. At that stage the ratchet 57 has engaged the next tooth of the ratchet wheel 56. The opening of the switch 52 deenergizes the solenoid 50 whereby the armature 54 is released and together with the lever 59 pivoted upwardly by the spring 58 to effectuate the advancement of the progressive switch or step switch to the next following stage in which the arrangement by the reclosing of the switch 52 is conditioned for effectuating a new advancement.

It will be understood that modifications of the drive will be possible within the scope of the invention. For example a ratchet driving arrangement of the type used in clocks in which the movement of the balance is controlled by means of electric impulses can be used.

In the information signal circuit system the apparatus shown in FIGURE 2 has in similarity with the apparatus shown in FIGURE 1 a plurality of information signal lines $u'_1$, $u'_2$, $u'_3$ . . . $u'_{20}$ connected to a respective one of terminals 1, 2, 3, 4, . . . 20 such as of a connector socket U′ which also includes a terminal for the y-line.

In addition the socket U′ has four terminals marked $ur_1$, $ur_2$, $w_1$ and $w_2$ of which the terminal $ur_1$ is connected through a line $ur'_1$ to the finger $R_1$ of the deck $D_1$ of the progressive switch arrangement.

The terminal $ur_2$ is through a line $ur'_2$ connected to the finger $R_2$ of the deck $D_2$ of the progressive switch arrangement.

The terminal $w_1$ is connected to the line $ur'_1$ and the terminal $w_2$ is operable through a pushbutton switch ON which is shunted by a relay switch 1, to provide a holding circuit upon release of the pushbutton switch ON connected to a winding of a relay L, the other end of which is connected to the positive terminal of a voltage source W, the negative terminal of which is connected to one end of the indexing or advancing arrangement S, i.e. to the normally closed switch 52.

The purpose of providing the four terminals $ur_1$, $ur_2$ and $w_1$, $w_2$ respectively will appear from the following description of the machine equipment.

Furthermore, in FIGURE 2 the opposite terminals of the socket which is adapted to receive the appropriately wired programme plug $M_2$ are, with respect to the terminals connected with the contacts of the command signal distributor deck $D_2$, marked with the same numbers as the stages of the progressive switch arrangement to identify these terminals and at the other side with capital letters A, B, C, D . . . .

In the embodiment shown in FIGURE 2 the means operable to initiate a machine function at a first stage of the progressive switch arrangement and to terminate the same machine function at a second stage as well as to maintain the machine function between said stages is in the form of relays RA, RB, RC . . . the windings of which are connected between respective terminals A, B, C, . . . and a common line $x'$ which is connected to the negative terminal of the voltage supply W. The relays have contacts $R_a$, $R_b$, $R_c$ . . . all of which are connected to one side of a separate voltage supply $W_1$ such as a supply mains, the other side of which is connected to a common lead $x$. The other terminals of the relay contacts $R_a$, $R_b$, $R_c$ . . . are connected individually to each of the command signal lines $h'_1$, $h'_2$, $h'_3$ . . . $h'_7$ which are connected to each of the terminals of the socket H' which is adapted to be connected to the machine function members of the machine equipment.

The voltage source W which is shown in the form of a battery may be in the form of a suitable power pack adapted to supply the circuit arrangement which includes the information signal lines and the relay windings with a tension of a suitable low voltage, for example 24 volts, and in such event the power pack includes suitable transformer means, rectifiers, filters and the like.

The relays RA, RB, RC . . . are, in order to maintain the machine functions during the indexing of the progressive switch arrangement through a plurality of steps, of the impulse sensing type which will attract their armatures when energized and thereby close their respective contacts and maintain the contacts closed until they receive a new energizing signal. Such types of relays are known in different commercial embodiments and therefore their construction or mode of operation is believed to be well known to those skilled in the art and will not be described in any greater detail. It will be appreciated, however, that the relays may be of the type which is mechanically attracted or the relay windings may be included in electronic circuits or in any other convenient manner alternatively rendered energized and deenergized in response to receipt of an actuating signal.

It will further be appreciated that this type of relays provides for versatility of the plug-in control apparatus as well as simplification in the design, because they enable maintaining of an operation without the necessity of providing separate holding circuits.

A convenient construction of a plug-in control apparatus as diagrammatically illustrated in FIGURE 2 is shown in FIGURES 3, 4 and 5. The components are enclosed in a casing CA on the front side of which the different sockets are mounted. The sockets are usually available in standard sizes, for example comprising ten terminals each. Accordingly for the information signal line terminals U' two sockets as shown at the left hand side of FIGURE 3, each comprising ten terminals, are used to provide the twenty terminals and for the command signal lines H' one socket as shown at the right hand side is used.

Below the command signal line socket H', a cycle counter is shown which in any suitable manner which does not form part of the invention is operatively connected with the progressive switch arrangement to indicate the number of times which the progressive switch arrangement has completed its series of stages so as to thereby indicate each complete cycle of machine functions of a working machine controlled by the plug-in control apparatus.

Under the cycle counter the pushbutton switch ON is shown and below that a switch S$t$ is shown which is the command line mains switch.

The socket which is adapted to receive the programme plug is shown at the left of the switches ON and S$t$ and includes three sockets each having for example ten terminals to provide twenty terminals numbered 1–20 for the connection with the contacts of the progressive switch arrangement, i.e. the terminals numbered 1–20 on the left hand side of the programme plug $M_2$ of FIGURE 2 and a socket having ten terminals for the connection with the nine command signal lines marked A–I, and a terminal for the terminal $Z_0$ shown above the terminal A in FIGURE 2 which is connected to the positive terminal of the voltage source W the function of which will appear from the following description.

As shown in FIGURES 4 and 5 the components are mounted on a partition or frame MT in the interior of the box. FIGURE 4 illustrates the mounting of the progressive switch with its indexing device, the power pack and the relay arrangement L. In addition FIGURE 4 shows a programme plug mounted in position in the sockets shown in FIGURE 3, and a box generally referred to by SN which by means of a cable is plugged in the command signal line socket. The box SN includes an auxiliary starter network or fault-finding network which will be more fully described in the following.

FIGURE 5 shows the components on the other side of the frame MT which includes the command control relays RA, RB, RC, RD, of which the relay RA is shown with its protecting casing removed. Preferably the relays are of the plug-in type so that in each case in accordance with the required number of machine functions the unit can be provided with the corresponding number of relays simply by plugging-in.

The programme plug $M_2$ which in FIGURE 4 is shown with a protecting casing is in FIGURE 5 shown with the casing removed so as to illustrate a cross-wiring.

In order to explain the simplicity of planning the automation, the versatility of the system and other advantages according to the invention the construction of a relatively simple automation equipment and the planning thereof will be explained with reference to FIGURES 6, 7 and 8.

As example a drilling machine is taken, because it is probably one of the most common machine tools.

In the case of manual operation of a drilling machine the operator takes the workpiece, moves it to the desired position relatively to the drill, holds it in position or clamps it by means of a simple manual clamping device, moves the drill down and upon completion of the drilling operation the operator moves the drill up, releases the workpiece from the clamping device and takes it away.

The simplest automation which can be made on a drilling machine is an automation which imitates the operations here described. This requires means for moving the workpiece to the drilling position, means for clamping the workpiece in the drilling position, means for moving the drill down, and upon completion of the drilling operation to move the drill up again, thereafter releasing the clamping and simultaneously throwing the workpiece out and bringing a new workpiece into position.

Such means may be in the form of hydraulic or pneumatic cylinders to replace the manpower.

In addition, however, sensing devices may be added to replace the operator's sensing.

The movements can be made in the form of simple unidirectional movements which render simple sensing devices applicable such as in the form of microswitches of any commercially available type. A simple analysis will show that in the absence of the operator's sensing, a sensing switch is necessary to provide a sensing signal at either end of the stroke of the workpiece transport member. A sensing switch is necessary at either end of the stroke of the clamping member, and sensing switches are necessary at either end of the stroke of the drill.

This leads to the construction of a simple equipment as shown in FIGURE 6 which includes a magazine 102 for a stack of workpieces, the lowest of which is located in a transport channel at the top surface of a table 108 under a cover plate 109. The forward transport and push-out after the drilling operation is effectuated by means of a reciprocable slide 110 which moves in the rear end of the feeding channel and is controlled by means of a cylinder $H_2$. The clamping is effectuated by means of a cylinder $H_1$ which has a pressure shoe 117 engaging the workpiece from the underside through an aperture in the table 108, and the up and down movement of the drill is controlled by means of a cylinder $H_3$.

The movement of the piston in each of the cylinders is controlled by means of pressure fluid from a pipeline 202, as shown in FIGURE 7, which has branches 204 and 206 communicating with each end of the cylinder $H_2$. In order to control the access of pressure fluid to the cylinder, solenoid valves $SV_1$ and $SV_2$ respectively are included in each of the branches 204 and 206 of the pipeline.

Such hydraulically or pneumatically operable cylinders for automatic controls as well as solenoid valves are available in a plurality of commercial embodiments. The solenoid valves are available commercially in two types, one which is normally open when not energized and known as the NO-type, and another one which is normally closed when not energized and known as the NC-type.

As will easily be understood the inoperative position of the cylinders, i.e. the position before a new cycle of operations is started, is with the slide 110 retracted, the clamping shoe 117 lowered and the drill raised. A simple analysis as indicated in FIGURE 7 shows that this requires a NC-type solenoid valve at the left hand end of the cylinder $H_2$ and a NO-type solenoid valve in the right hand end.

FIGURE 7 also indicates the arrangement of one of the sensing switches, i.e. the one referred to by $U_7$ in FIGURE 6, to be actuated in the neutral or inoperative position of the piston of the cylinder $H_2$. The microswitch is mounted on a relatively stationary part 101 behind the reciprocable slide 110 in such a position that its switch control member $U_s$ is engaged by an abutment 111 on the reciprocable slide 110 when the slide has been retracted. The commercially available microswitches usually have three terminals marked according to standard coding 1, 2 and 3 and as referred to in FIGURE 7 by reference characters $Ms_1$, $Ms_2$ and $Ms_3$ whereby those skilled in the art will know that when the control member $U_s$ is inactivated there exists a connection through the switch between the terminals $Ms_1$ and $Ms_2$ and when the control member $U_s$ is activated there exists a connection between the terminals $Ms_1$ and $Ms_3$. Since the switches are to be arranged to signal the end positions of the three machine function members described in order to close the information signal circuit lines to advance the progressive switch arrangement of the plug-in control unit in the respective end positions in which the switches will be mechanically activated, it will be understood that the necessary six end switches must be connected with those of the two terminals between which connection is established upon actuation of the switch connected to the information signal lines.

In FIGURE 6 the respective end switches are shown diagrammatically only to facilitate the survey of the wiring. The switch $U_2$ indicates the forward movement of the transport slide, the switch $U_3$ indicates the operation of the clamping shoe 117. The switch $U_4$ indicates the completed down stroke of the drill with completed drilling, and the switch $U_5$ indicates the return of the drill to its inoperative position. The switch $U_6$ indicates the inoperative position of the clamping shoe 117, and eventually the switch $U_7$ indicates the return of the transport slide 110 to inoperative position.

Now a relatively simple analysis of the problems will indicate that an operator's sensing in addition to the sensing by means of the six switches $U_2$–$U_7$ includes a sensing of whether the supply of workpieces from the box or the like from which the operator takes the workpieces is exhausted, and it is therefore advisable to add to the machine equipment a workpiece sensing device which may be in the form of a pivotable lever 124 which is spring-loaded and has a feeler finger or the like which engages the workpieces in the magazine, and when the supply of workpieces is running short is released to enable the lever to be tilted whereby it actuates a sensing switch $U_8$. The analysis will show, however, that since this sensing switch $U_8$ when used to effectuate a stage of the progressive switch arrangement of the control unit must be a switch which is normally closed. This can be obtained either by connecting its terminals in similarity with the switch $U_7$ as described in connection with FIGURE 7 and cause the feeler lever to retain it mechanically activated until the feeler finger is released, or alternatively the switch $U_8$ can have its terminals connected in the respective sensing signal line that it retains the line closed until it is mechanically activated to open the line in response to sensing movement of the lever 124.

A further analysis of the automation will indicate that it is not sufficient to sense the presence of workpieces in the magazine. If the drilling machine is manually operated the operator's sensing also includes observation that the workpieces are duly forwarded. If, however, in FIGURE 6 the lowest workpiece in the magazine is jammed, the machine will continue its automating cycle, but the drill will still move down in the hole of the same workpiece and can continue to do that for hours until somebody discovers that there is something wrong with the machine.

This can be avoided by providing a sensing switch in the feeding channel or alternatively as shown in FIGURE 6 by providing a sensing device to signal throwing out of workpieces which is possible because the workpiece is automatically thrown out in the end of the feeding channel when a new workpiece is forwarded.

This sensing device includes a plate 97 which against the action of a spring is tiltable between a workpiece-receiving position shown in full lines and a workpiece-delivering position shown in dotted lines. The sensing plate is supposed to be spring-loaded and retained in the position shown in full lines.

When a workpiece is thrown out and hits the sensing plate 97 and thereby tilts the plate to the position shown in dotted lines a sensing switch $U_9$ is closed. This provides the safety with respect to proper operation of the transport slide 110. If, however, the sensing device 97 should be damaged so that the plate does not return to its upper position, the arrangement is of no use and therefore a further switch $U_{10}$ is included in the sensing device 97 to be closed in response to the returning of the plate 97 to its operative sensing position. A simple analysis will show that both switches $U_9$ and $U_{10}$ can be provided by appropriate wiring of the three terminals of a standard microswitch according to the teaching given in connection with the switch $U_7$ in FIGURE 7.

With the analysis explained here and in the case of a simple machinery as shown in FIGURE 6 it will not cause any skilled mechanics any difficulties to design the machine equipment, mount the cylinders in correct position for moving the parts of the machine and mounting the microswitches in correct position to be actuated by the various parts at the ends of their strokes or to signal their movements.

The fact that according to the invention the information signals are converted into a plurality of discrete steps of the progressive switch arrangement or counter which follow the sequence of the information signals so that each step is individually correlated to a respective information signal enables the wiring of the machine equipment shown in FIGURE 6 to be effectuated in that simple manner that one side of all the sensing switches is connected to the common line $y$ and the other side of each of the sensing switches is connected to an individual lead or line which is marked to be identified with the switch.

The solenoid valve pairs which are connected with each of the cylinders are connected in parallel as indicated in FIGURE 7. All the three parallel solenoid valve pairs are, however, at one end connected to the common line x, and the other ends of the solenoid valve pairs are each connected to a line marked in such a manner that it can be identified with the respective cylinders.

The instruction to the electrician hereafter is that the identifiable individual lines which are connected to the sensing switches must be connected to the terminals of the socket U″ in numbered sequence corresponding to the sequence in which the switches are operated throughout the cycle of the machine functions. This analysis can easily be made by the supervisor who has been planning the machine equipment and it will be appreciated that it does not present any difficulties to list the sensing sequence starting with the switch $U_1$ as the starter switch and thereafter comprising $U_8$, $U_2$, $U_9$, $U_{10}$, $U_3$, $U_4$, $U_5$, $U_6$ and $U_7$, because the sensing by means of the switches $U_8$ and $U_9$ is indicative of the correct function of the machine function member $H_2$ and must be effectuated as a prerequisite for allowing the machine function member $H_1$ to be actuated.

With respect to the solenoid valve lines the instruction to the electrician is simply that the common line is connected to the terminal x of the socket H″, and the individual lines may be connected to the first three terminals in any arbitrary sequence.

In order to prepare the plug-in control apparatus for running the machine equipment wired in the manner here described automatically through its cycle, the only procedure which remains is to wire the programme plug M2 and as a wiring aid a programme chart as illustrated in FIGURE 8 is used.

The programme chart shown in FIGURE 8 has a vertical column with a plurality of horizontal lines numbered in sequence or otherwise marked so that each line corresponds to the same stage of the progressive switch arrangement or counter device.

Since as explained with reference to FIGURE 1 the numerical value of the progressive switch arrangement or counter device is represented by discrete steps and the counter device is so connected with the information signal lines that there is step identity between each information signal as being indicative of a programme step and each counter step as being indicative of a numerical value, this means that in the programme chart the numbers of the horizontal lines in addition to representing the discrete steps of the counter device also represent the corresponding information signals.

As also apparent from the dersciption of FIGURE 1 the counter device operates to interlock functions in data by effectively providing digital counting of data or information signals only so as to express the data or information signals by means of discrete steps of the counter device. Simultaneously, the counter device provides sequence control of the machine functions responsive to a predetermined number of counter stages. The programme plug serves the purpose of distributing the command signals to the electrical actuators, such as the solenoid valves of the machine function members in said predetermined sequence.

To illustrate the interlocking of functions in data or information signals the programme chart is provided with a horizontal column having a plurality of vertical lines intersecting the horizontal lines which represent and correspond to the discrete steps of the counter device. The vertical lines are marked so as to be identifiable with the command signal lines the marking in FIGURE 8 being by capital letters A, B, C . . . corresponding to the capital letters A, B, C . . . used for identifying the right hand side terminals of the socket adapted to receive the programme plug $M_2$.

The horizontal lines have headings for introducing text to identify the sensing or information signals and columns to introduce the number of the corresponding switches on the working machine. In the same manner the vertical lines have headings for introducing text to identify the functions followed by columns in which the number of the machine function members can be introduced.

The simplicity of using the programme chart will best be understood from the following example in connection with FIGURE 6:

The analysis of the sequence of sensings during the machine cycle of the arrangement shown in FIGURE 6 has already been explained. The text to be introduced in the horizontal lines may as indicated be in the form of short questions.

The first prerequisite for running the machine is that the main switch is closed. Therefore the first question is: Is main switch closed. The main switch is numbered $U_1$ and this number is introduced in the corresponding column. Starting with the three function numbers in inoperative position the next question is: Are there workpieces in the magazine. The corresponding switch is $U_8$ and is introduced in the switch number column of line 2. When these two prerequisities are fulfilled the machine can be allowed to run and the next sensing introduced: Is transport forward. The corresponding sensing switch is $U_2$. By proceeding in this manner the remaining text of the following lines becomes:

(4) Is workpiece out _____ $U_9$
(5) Is feeler up _____ $U_{10}$
(6) Is clamp OK _____ $U_3$
(7) Is drill down _____ $U_4$
(8) Is drill up _____ $U_5$
(9) Is clamp loose _____ $U_6$
(10) Is transport returned _____ $U_7$ The machine functions are hereafter introduced in the headings of the vertical lines of the programme chart in the same arbitrary sequence in which the machine function members or electrical actuators therefor were connected to the terminals of the socket H″ whereby the text introduced in the horizontal lines becomes the following:

Transport _____ $H_2$
Clamping _____ $H_1$
Drill _____ $H_3$

It now only remains to analyze at which stages of the digital counting of the sensings the machine functions must be initiated and terminated.

Nothing must happen until the two first sensings have been carried out. When, however, the progressive switch arrangement has been advanced to stage number 3, the transport can be allowed to be actuated which is indicated by marking the intersection between line 3 of the sensing column and the transport line of the function column, i.e. the first line.

When the closing of the switch $U_2$ as sensing of correct forward transport brings the progressive switch to stage number 4, the sensing device 97 must be moved by a falling workpiece in order to bring the progressive switch to stage number 5 where by means of microswitch $U_{10}$ correct action of feeler 97 is ascertained after which the progressive switch is brought to stage number 6. Now, the clamp can be allowed to be actuated, and the intersection between sensing line number 6 and function line number 2 is marked.

By proceeding in this manner stage line number 7 is marked to indicate that the drill can be moved down and stage line number 8 marked to indicate that the drill can be moved up again. Hereafter stage line number 9 is marked to indicate that the clamp can be loosened and stage line number 10 marked to indicate that the transport can be returned.

Since the relays are of the self-holding type as previously described each relay has to be connected to the command signal line terminals corresponding to the stages at which the relay is activated as well as inactivated and to indicate that, vertical lines are drawn on the programme chart between the beginning and termination of each function such as shown in FIGURE 8.

When these marks are entered in the programme chart the necessary electrical wiring of the programme plug can be copied directly from the chart, namely by making the cross wirings between the right hand terminals marked with figures according to the marked intersection between the columns of the programme chart.

In other words, terminal A is connected with terminals 3 and 10, terminal B is connected with terminals 6 and 9, and terminal C is connected with terminals 7 and 8.

This wiring of the programme plug is shown in FIGURE 2 and it will be understood that when the plug-in control unit is connected with the machine equipment shown in FIGURE 6 and the starter switch $U_1$ is closed, the mode of operation will be substantially as follows:

The closing of the starter switch $U_1$ advances the counter device or progressive switch arrangement to stage number 2. Provided that there are workpieces in the magazine the sensing switch $U_8$ will remain closed and advance the counter to stage number 3. At this stage, the cross connection in the programme plug activates the relay RA which closes its contact Ra and thereby provides a command signal to the transport cylinder $H_2$. Upon forwarding of the workpiece the closing of the sensing switch $U_2$ switches the counter to stage number 4. At this stage the sensing device 97 operates to make sure that it is a new workpiece which thereafter is clamped. The workpiece which was drilled during the preceding cycle of operations has fallen down on the plate 97 and closes the switch $U_9$ which advances the counter to stage number 5. In the meantime the workpiece has fallen further down and the feeler plate 97 returns to its inoperative position and closes switch number $U_{10}$ which advances the counter to stage number 6. At that stage the cross connection in the programme plug activates the relay RB which renders the clamp 117 effective which causes closing of the switch $U_3$. Thereby the counter is advanced to stage number 7 at which the relay RC is energized and renders the drill control effective to move the drill down, and when the drill has been moved down this closes the switch $U_4$ which advances the counter to stage number 8. At that stage the second cross connection in the programme plug to the relay RC deenergizes the relay RC whereby the drill moves up again and closes the switch $U_5$. This advances the counter to stage number 9 at which the second cross connection to relay RB deenergizes this relay and renders the clamp 117 ineffective. This closes the switch $U_6$ whereby the counter is advanced to stage number 10 at which the second cross connection to the relay RA renders the transport ineffective and returns the transport slide 110 so as to condition the machine equipment for the repetition of a new cycle of operations in the manner here described.

The cycle will remain until the magazine feeler indicates that the supply of workpieces is running short whereby the switch $U_8$ will be opened and thereby cause the cycle to be stopped at stage number 2.

It will also be understood that the failure of any sensing switch will stop the machine at a point of the programme at which the failure occurs.

As will be appreciated from the foregoing a substantial simplicity and versatility with respect to the programming is obtained thereby that the digital counter device provides a plurality of numerical values each of which is represented by a discrete step and is so connected with the machine sensing means or information signal means as to synchronize the information signals and the numerical values. The numerical values are then used to provide numerical control of the machine functions by deriving the command signals directly from the numerical values and distribute the command signals in the desired predetermined sequence through the programme plug. Hereby the interlocking between the information signals or the machine data and the machine functions is provided by means of the numerical values or discrete steps of the counter device or progressive switch arrangement.

This obviates the use of circuitry or the like for producing analog voltages with the necessity of producing analog voltages at the machine side by means of sensing devices to be compared with the analog voltage used for the control. The numerical control according to the invention is a sequence control in which informations or data only provide digital counting expressed by means of discrete steps of the counter. The machine functions are carried out between predetermined of said discrete steps in desired programme sequence and rendered effective or initiated and ineffective or terminated in programme sequence at said predetermined discrete steps but entirely independent of the indexing or advancing of the counter.

This is simpler than using counting to make decisions based on continuous comparison of data obtained during the machine cycle or process with data previously set into the counter because the sequence patterned for the complete cycle as well as for individual processes included within the cycle is only determined by the discrete counting steps. The only human intelligence necessary at the initial step in the programming is to decide about the sensings or informations and to place the informations in the same sequence as the discrete steps.

It will be understood that the same planning and control can be applied to a single process by dividing the process into two or a plurality of subprocesses which in such event are programmed as subprocesses in sequence with sensing devices operating to provide the discrete steps between each sub-process.

By way of example this may provide the performance of machining with tolerance by sub-dividing the machine process into sequential sub-processes and including in the machining process at convenient steps thereof such other processes as changing machine speed, actuating a workpiece gauge, continuing the machining at reduced speed through a period which may be determined by time or a predetermined number of revolutions of the machine spindle, regauging the workpiece and if desired repeating gauging and machining alternatively until the gauging device signals that the desired tolerance has been obtained.

The versatility of the numerical sequence control according to my invention will be obvious from FIGURES 6 and 8 only. It will be understood that in connection with the first stage of automating a drilling machine in the manner described it may not be necessary to include the workpiece feeler 124 and the workpiece throw-out feeder 97 with appertaining sensing switches $U_8$, $U_9$ and $U_{10}$. In such event the sensing switches $U_1$, $U_2$ . . . $U_7$ will be connected in their number sequence to the correspondingly numbered terminals of the socket U″ and the connection of the programme plug will be wired according to a correspondingly modified programme chart.

A drilling machine automated in this manner may work satisfactorily over a substantial period. It will probably soon be discovered that the machine continues to complete its cycle when the magazine is empty which necessitates the addition of the magazine feeler and the switch $U_8$. Since supplementary discrete steps are available in the plug-in control apparatus the only human intelligence required for extending the programme to include this sensing is to decide that it comes in as the discrete step immediately following the closing of the switch $U_1$. This only requires reconnecting the other information signal lines in the sequence in which they already were connected and rewiring the programme plug.

When perhaps then it is later discovered that the machine fails because the workpieces sometime remain hanging in the magazine it is just as easy to add the throw-out feeler 97 and decide that its information signal comes in as a step immediately after the completion of the forward transport, i.e. after closing of the switch $U_2$, and the only human intelligence required is to connect the switches $U_9$ and $U_{10}$ to the terminals 4 and 5 of the socket U″, and reconnect the remaining information signal lines in the previous sequence to the terminals 6, 7, 8, 9 and 10 and draw up the new programme chart as shown in FIGURE 8.

Now assuming that the workpieces are in the form of striking plates for locks which in advance have been stamped out with a rectangular aperture and two fastening holes, and that the desired drilling operation resides in countersinking the holes to receive flat countersunk screws, the machine as automated in the manner illustrated in FIGURE 6 would require running the workpieces through the machine twice with opposite ends facing the drill so that one hole is countersunk during the first passage of the workpieces through the machine and the second hole countersunk during the second passage of the workpieces through the machine.

A proper answer to avoiding the repeated drilling operation is to provide the forward stroke in two steps to as to first countersink the hole in the front end of the workpiece, then move the workpiece forward to countersink the hole in the rear end, then reduce the length of the stroke to bring the front hole in the next workpiece in position, and thereafter again increasing the length of the stroke, etc. This requires the addition of a stop for the transport slide in an intermediate position and means for rendering the auxiliary stop effective and ineffective.

To illustrate the versatility and further possibilities of planning a numerical sequence control automation according to the invention these possibilities together with the possibilities of including further refinements with the machine are illustrated in FIGURE 9, and the corresponding programme chart is shown in FIGURE 10 with the wired programme plug shown included in the plug-in control apparatus in FIGURE 11.

In addition to the embodiment according to FIGURE 6, FIGURE 9 features a reciprocable stop 114 for providing different lengths of the stroke of the transport slide 110 controlled by the cylinder $H_1$, a gauge device 122 controlled by the cylinder $H_6$, and a drill adjustment device 130, 132, 134 controlled by a solenoid $H_7$ for automatically adjusting the drill.

The equipment shown in FIGURE 9 is in more specific terms as follows:

The transport slide 110 is reciprocated, controlled by a cylinder $H_2$. The inoperative position, i.e. left hand retracted position, is sensed by a switch $U_{18}$, the middle position by a switch $U_3$, and the completed forward stroke by a switch $U_9$.

To provide a stop for the transport slide in the middle position, a reciprocable stop 114 is provided controlled by a cylinder $H_1$ with the inoperative retracted position sensed by closing of a switch $U_8$ and the operative forward position by closing of a switch $U_2$. This position, of course, corresponds to engagement between the abutment 110a against the movable stop 114 and is the position in which the sensing switch $U_3$ is closed.

The starter switch $U_1$ is to show the possibilities of connecting two switches in series connected in series with the magazine sensing switch which is referred to as $U'_1$.

In order to clamp the workpieces in the one or the other of the two positions, two clamping members 116 and 118 are provided. The clamping member 116 is controlled by a cylinder $H_3$, with the inoperative retracted position closing a sensing switch $U_7$, and the operative clamping position closing a switch $U_4$. The clamping member 118 is controlled by a cylinder $H_5$ and its inoperative retracted position is signalled by the closing of a sensing switch $U_{13}$, while the operative clamping position closes a sensing switch $U_{10}$.

The up and down movement of the drill is controlled by a cylinder $H_4$ with the top position being sensed by the closing of a sensing switch $U_6$ and the down position being checked by the closing of a sensing switch $U_5$. As will be apparent from the following description the up and down movement of the drill is repeated during the complete cycle whereby also the actuation of the sensing switches $U_6$ and $U_5$ is repeated. To identify these switches later in the programme they are also referred to as $U_{12}$ and $U_{11}$ respectively, corresponding to the stages of the counter device at which they are later operated.

The gauging arrangement 122 includes a tiltable lever having a gauging member 120 adapted to engage with the countersunk holes. The tilting is controlled by means of a cylinder $H_6$ with the inoperative position sensed by the closing of a sensing switch $U_{17}$ and the operative position in engagement with the hole controlled by the closing of a sensing switch $U_{14}$.

The drill adjustment device includes a swingingly arranged lever 130 which carries a ratchet 132 adapted to engage a ratchet wheel 134 on a screw threaded pin 136 which can be turned in a screw threaded hole in an arm 138 and the top end of which provides the stop that determines the lower position of the drill, for example by engagement with the arm of the drilling machine. The lever 130 is spring-loaded and is swung in clockwise direction in response to the energization of a solenoid $H_7$. Upon deenergization of the solenoid $H_7$ the lever 130 returns to its inoperative position.

In the following it is assumed that the workpieces are so hard that a minor adjustment of the drill due to wear thereof is necessary each time during the automating cycle of the machine, while in a following embodiment it will be illustrated how the automatic adjustment or another machine function can be bypassed or rendered ineffective.

In similarity with the analysis of operations set forth in connection with FIGURE 6, it will be understood that the planning of the system shown in FIGURE 9 and drawing up of the programme chart can be carried out in the following manner:

The prerequisite for allowing the equipment to be started to carry out its automatic cycle is that the starter switch $U_1$ and the workpiece sensing switch $U'_1$ which are connected in series both are closed. This is entered in line number 1 of the sensings of the programme chart shown in FIGURE 10 and indexes during the cycle the counter or progressive switch to stage number 2.

At this stage the middle stop must be activated.

The arbitrary connection of the electrical actuators for the machine function members or cylinders is as shown so that the transport slide cylinder $H_2$ corresponds to the first terminal or the terminal A of the programme plug. The middle stop cylinder $H_1$ corresponds to the terminal B. The control cylinder $H_3$ for the clamp 116 corresponds to the terminal C, and the control cylinder $H_5$ for the clamp 118 corresponds to the terminal D. The control cylinder $H_4$ for the drill corresponds to the terminal E. The gauge cylinder $H_6$ corresponds to the terminal F, and the adjustment solenoid $H_7$ corresponds to the terminal G.

At stage number 2 the middle stop 114 should be rendered effective which is marked at the intersection between the programme chart lines 2 and B. The corresponding sensing is that the middle stop is active and the corresponding switch is the sensing switch $U_2$. This is entered in the second line of the sensings on the programme chart, and the correct closing advances the counter of the plug-in control to stage number 3.

At this stage the transport slide cylinder $H_2$ can be permitted to be activated which is marked on the programme chart in the intersection between lines number 3 and A, and as to the sensing the text is entered to indicate that the middle transport position is reached which is signalled by the closing of the sensing switch $U_3$.

The closing of the sensing switch $U_3$ advances the counter device to stage number 4 at which the first clamp 116 is to be rendered effective, the sensing of this being indicated with the text that the first clamp is up in the corresponding sensing switch $U_4$.

The equipment is at this stage 5 following the closing of the sensing switch $U_4$ conditioned for allowing the drill to be moved down as marked at the intersection of the columns 5 and E with the corresponding question: Is drill down, and identification of the sensing switch, $U_5$ therefor.

The closing of the sensing switch $U_5$ advances the counter to stage number 6 at which the drill can be allowed to be moved up again as indicated by the second marking of line E at the intersection with the line number 6 together with the text: Is drill up, and the corresponding sensing switch number $U_6$.

The advancement to stage number 7 upon closing of the sensing switch $U_6$ must render the clamping member 116 ineffective to provide for the second part of the forward stroke of the slide 110. This is marked at the intersection of line C and line number 7, and the text reads: Is first clamp down, with the indication of the corresponding sensing switch $U_7$.

Before the transport slide can be forwarded to complete its stroke, the middle stop 114 must be retracted at stage number 8 as marked by the intersection between the lines B and 8. The check on the retraction of the middle stop is signalled by the closing of the switch $U_8$ which advances the counter to stage number 9.

Since the control cylinder $H_2$ for the transport slide 110 has remained activated no actuation takes place at stage number 9, because the actuated cylinder $H_2$ will take care of the further movement of the slide 110 until its stop engages the stationary table 108 which causes sensing by means of the switch $U_9$ which is an answer to the question that the transport is forwarded whereby the counter is indexed to stage number 10.

At this stage it is the second clamp 118 which has to be rendered effective which necessitates the actuation at stage number 11 of the cylinder $H_5$ corresponding to line D.

Hereafter again in the manner described hereinabove the drill is activated and inactivated at stage number 11 and 12 respectively with the corresponding switches previously referred to as $U_5$ and $U_6$ now being referred to as $U_{11}$ and $U_{12}$, and upon closing of the switch $U_{12}$ and indexing of the counter to stage number 13 the second clamp 118 is rendered inoperative also as indicated in the same manner as with respect to the first clamp 116.

The following advancement of the progressive switch arrangement to stage number 14 causes activation of the gauge control cylinder $H_6$ as marked at the intersection between the line 14 and line F and closing of the sensing switch $U_{14}$ with subsequent advancement of the counter device to stage number 15 at which the drill adjustment is activated to compensate for wear of the drill marked at the intersection between lines 15 and G.

The closing of the switch $U_{16}$ which signals the activation of the drill adjustment advances the counter device to stage number 16 at which the adjustment control solenoid $H_7$ is deenergized as marked at the intersection between lines G and 16.

Eventually at stage 17 the gauge 122 is rendered ineffective and at stage 18 the transport slide control cylinder $H_2$ is rendered ineffective to return the slide so as to repeat the cycle.

This analysis is made in the same manner as described with reference to FIGURE 6, and the marking of the intersections of the lines corresponding to the sensings and the machine functions of the programme chart as well as introduction of the text also correspond to FIGURE 6 such as will be apparent from FIGURE 10.

Since the programme chart is a graphical illustration showing the functional relationship between each data signal and the corresponding discrete steps of the counter device with the beginning and termination of the functions so as to illustrate the interlocking between data signals and functions, the wiring of the programme plug can be effectuated foolproof by direct reading on the programme chart, and as will be understood the wiring corresponding to the programme chart of FIGURE 11 will be as shown with respect to the programme plug $M_2$ of FIGURE 11.

It will be appreciated that with the addition of the automatic control of FIGURE 9 in comparison with those shown in FIGURE 6, still the same control apparatus can be used for running the machine through its cycle, the only necessary change being to plug-in the rewired programme plug $M_2$ and upon connection between the plug-in control unit shown in FIGURE 11 and the machine equipment shown in FIGURE 9, the machine equipment will be run automatically through its cycle in the manner hereinbefore described.

In FIGURE 6 a short-circuiting is shown on the machine side between the lines $ur_1$ and $ur_2$ as well as between the lines $w_1$ and $w_2$. This is necessary in order to provide the energization of the control relays RA, RB, RC, from the voltage source.

In FIGURE 9 the lines $w_1$ and $w_2$ are connected to an emergency switch marked N which is normally closed but which when actuated will be opened whereby the holding circuit through the hold relay L,1 (FIG. 2) will be interrupted and the machine stopped immediately at which event the equipment only can be restarted by means of the ON switch on the plug-in control unit. I have found this scheme convenient because if under start of the automation equipment or during inspection of the automatically operating machine something goes wrong which requires actuation of the emergency switch N experienced personnel should be called in and the instructions should be that the control unit must only be operated by experienced personnel.

Now it would usually not be necessary to adjust the drill during each complete operation cycle, and FIGURE 12 therefore illustrates means for bypassing the adjustment function.

More specifically FIGURE 12 provides in an automation system as hereinbefore described which includes means or operation performing members operable to effect a first and a second machine function, means operable to provide a predetermined data signal prior to that stage of the control means or progressive switch arrangement at which the second machine function is supported to be rendered effective. Said predetermined data signal is indicative of a machine condition which obviates the second machine function. The system in addition includes means for rendering said predetermined data signal operable to render the respective operation performing member of the second machine function inoperative at the stage of the progressive switch arrangement.

Still more specifically the adjustment of the drill which is controlled by the solenoid $H_7$ represents a machine function which in FIGURE 9 is rendered effective at stage number 15 of the control apparatus. Prior to that stage, i.e. at stage number 14, the gauge control $H_6$ is rendered effective. Now in FIGURE 12 the arrangement includes, in addition to the sensing switch $U_{14}$ which is indicative of the operation of the gauging means 122, switch means O' adapted to be operated by the gauge means 122 to provide a data signal prior to the stage, i.e. stage number 15, at which the drill adjustment is rendered effective, said data signal being indicative of a machine condition which obviates the drill adjustment. In addition the operation of the switch O' renders the drill adjustment control solenoid $H_7$ inoperative at stage number 15.

To this purpose the switch O' is as shown in FIGURE 12 a normally closed switch which is connected across the lines connected to the terminals $ur_1$ and $ur_2$. The switch O' is arranged to be operated from the gauge means 122 in such a manner that if the hole produced by the drilling operation is deep enough, the switch is opened, and if the hole is not deep enough the switch remains closed.

Accordingly if the hole is not deep enough and the switch remains closed it corresponds to the connection of the terminals $ur_1$ and $ur_2$ of FIGURE 9 whereby the advancement of the progressive switch arrangement upon closing of the sensing switch $U_{14}$ to stage number 15 will render the drill adjustment control solenoid $H_7$ effective and cause adjustment of the drill with the subsequent operations and stages being as already described with reference to FIGURE 9.

If, however, the hole is deep enough and the switch O' is opened, this will result in opening of the circuit between the terminals $ur_1$ and $ur_2$ at the moment when the progressive switch arrangement is advanced to stage number 15. Since, however, all the command signal lines which are connected to the left hand terminals of the programme plug $M_2$ are energized over the connection between the terminals $ur_1$ and $ur_2$, the opening of the switch O' at stage number 15 renders as shown in FIGURE 11 the control relay RG for the drill control solenoid $H_7$ ineffective and thereby renders the machine function, i.e. drill adjustment, inoperative in response to the indicating by the gauge arrangement and the switch O' that the machine function is unnecessary.

Since therefore at stage number 15 of the progressive switch arrangement the sensing switch $U_{15}$ is not operated, it is necessary to duplicate this latter switch in order to advance the control arrangement to the next following stage number 16. The duplicated switch is in FIGURE 12 referred to by $U'_{15}$ and is also operated by the gauge means 122 so as to cause the switch $U'_{15}$ to be closed concurrently with the opening of the switch O', i.e., when the gauge means shows that the hole is deep enough. It will be understood that the duplicate switch $U'_{15}$ should not be closed if the gauge means indicates that the hole is not deep enough.

The closing of the duplicate switch $U'_{15}$ thereby advances the progressive switch arrangement to stage number 16 in which the drill adjustment sensing switch $U_{16}$ will be found closed whereby the progressive switch arrangement is advanced to stage number 17. At this stage the $ur'_2$ line of FIGURE 11 will still be deenergized because the gauge is still in the gauging position and keeps the bypass control switch O' open. Therefore, in order to render the gauge control member $H_6$ ineffective at stage number 17 a second auxiliary switch O'' is provided in connection with the sensing switch $U_{17}$ connected to terminal number 17 of the socket U'' of FIGURE 12 as well as to the terminal $ur_2$. Hereby at stage number 17 the line $ur'_2$ of the control apparatus in FIGURE 11 will be energized from the sensing signal line $u'_{17}$ and the auxiliary switch O'' whereby at stage number 17 the control relay RF for the gauge control member $H_6$ will be activated so as to render the member $H_6$ inoperative and thereby move the gauge out of engagemet with the workpiece. By this movement the auxiliary switch O'' will be opened and upon completion of the termination of the machine function which is represented by the gauging, the switch $U_{17}$ will be actuated and advance the progressive switch arrangement of the control apparatus to stage number 18 whereafter the remaining operations will be as shown and described with reference to FIGURE 9.

It will be understood that the bypassing of an operation which is planned within the normal automatic cycle or machine process hereby can be made conditional on the operation of a suitable sensing device. The bypassing may within the scope of the invention be effectuated in a different manner, for example by means of a relay which is energized by a member of the sensing device and which is deenergized at the stage which corresponds to the termination of the bypassed operation. It will also be understood that such relay means may include a plurality of relay contacts each of which may be included in circuits to replace such sensing switches which are not actuated when one or more operations are bypassed.

It will also be understood that it is possible in connection with the arrangement shown and described to include a sensing device which feels if the holes are too deep and thereby causes adjustment of the drill in the opposite direction.

Instead of including an operation which can be aforeseen not to be necessary during each machine cycle in the programmed cycle it is also possible within the scope of the invention to construct the corresponding sensing means to indicate the necessity of adding the operation and in response thereto to carry out the operation as an auxiliary machine function.

More specifically the invention provides in such event the drill adjustment as an operation performing member adapted to effect the auxiliary machine function. When in such event during the normal cycle of operations the progressive switch device of the control apparatus is selectively and sequentially switched from one stage to the next following stage and at respective stages command signals are derived from the control apparatus and properly distributed to the operation performing members and the auxiliary sensing device or gauge means 122 produces a data signal indicating the necessity of carrying out the auxiliary machine function, i.e., adjustment of the drill, the data signal produced by the gauging device at the respective stage of the progressive switch arrangement operates to include the auxiliary function between the preplanned programme or machine function steps.

A modification of the arrangement shown in FIGURES 11 and 12 illustrating this possibility is shown in FIGURE 13.

In FIGURE 13 the arrangement and mode of operation is up to stage number 14 of the progressive switch arrangement the same as shown and described with reference to FIGURE 12. In FIGURE 13, however, a different type of relay for controlling the energization of the drill adjustment solenoid $H_7$ is used and referred to by RG'. This relay has its winding in series with its contact which is closed when the relay is energized included in series with the solenoid $H_7$ and is included in a circuit which extends from one side of an auxiliary switch O''' which is connected to the sensing signal line $u'_{15}$ the other side of the switch O''' being connected to an extra terminal 30 of the socket U'' through a corresponding wire of the cable to an extra terminal 30 of the socket H', the left hand terminal number 15 of the programme plug, and a cross wiring thereof to the right hand terminal G beyond which the relay RG' in series with the solenoid $H_7$ completes the circuit to a return line over extra terminals X' of the sockets H' and H'' to the negative terminal of the voltage source W.

The switch O''' is a switch which is normally closed and remains closed unless the feeler signals that the hole is deep enough. If this is not the case and the gauge control has been activated at stage number 14 and upon closing of the sensing switch $U_{14}$ has moved the progressive switch further to stage number 15 the following happens:

The switch O''' remains closed and due to the connection between one side of this switch and the sensing signal line $u'_{15}$ an energizing circuit is established from the positive terminal of the voltage source, the line $ur'_1$, the line $u'_{15}$, the switch O''' to terminal number 15 of the programme plug through the cross wiring thereof, the relay RG' and the solenoid $H_7$, whereby the solenoid will be energized and swing the adjustment lever 130 in clockwise direction to adjust the drill. In response to this swinging of the lever 130, a sensing switch U'''₁₅ will be closed which advances the progressive switch arrangement to stage number 16 and thereby deenergizes the circuit through the relay RG' and the solenoid H₇ and as shown by the cross connection in the programme plug M₂ also deenergizes the control relay RF for the gauge control H₆ so that the gauge is rendered inoperative and closes the last sensing switch U₁₆ whereby the progressive switch arrangement is further advanced to stage number 17 which terminates the cycle.

If the hole is deep enough the switch O''' will be opened at stage number 15 and in order to advance the progressive switch arrangement to stage number 16 an extra sensing switch U'''₁₅ is provided to duplicate the switch U''₁₅. It will be understood that if the hole is deep enough the closing of the switch U'''₁₅ will immediately at stage number 15 advance the progressive switch arrangement without the drill adjustment being effectuated.

It will be understood that it will be possible to modify the arrangement shown in FIGURE 13 so as to gauge the hole which has just been drilled when the drill is moved up and programme the cycle so that the operation of the gauge arrangement if the hole is not deep enough in addition to the drill adjustment operation gives a signal to the drill to repeat the drilling operation after the adjustment, and if desired to continue such repetition until the hole is deep enough.

The system according to the invention also provides for, if desired, adding more complex auxiliary programmes to the predetermined cycle of operations or machine processes by providing an auxiliary sensing device which produces a data signal indicating the necessity of carrying out an auxiliary programme. Such data signal may then be used to interrupt the machine cycle at a predetermined stage and simultaneously initiate the auxiliary programme upon completion of which the control means for the auxiliary programme is rendered ineffective and the machine cycle continues at the stage at which it was interrupted.

A modification illustrating this possibility with an auxiliary programme, controlled by a plug-in control apparatus substantially as shown in FIGURE 2 is illustrated in FIGURE 14, the programme chart of the auxiliary control apparatus being shown in FIGURE 15.

The auxiliary programme to be described in connection with FIGURES 14 and 15 is supposed to be associated with the machine equipment already described with reference to FIGURE 9 or 12 and comprises the steps of shifting a workpiece magazine.

To this purpose the workpiece magazine has a lower stationary part 102a supported on the table 108 and associated therewith a feeler arm 103 operable to close a switch Q when the supply of workpieces is running short.

The upper part of the workpiece magazine is mounted on a turntable which has a plurality of magazine top parts loaded with workpieces. When the workpiece magazine is in position in alignment with the lower stationary part, the turntable is supposed to be locked by a member 152 which engages in a hole in the turntable and which can be retracted to an inoperative position by means of an electrically controlled machine function member MH₁ such as a solenoid valve controlled cylinder. A sensing switch MU₈ provides a data signal that the lock member 152 is in its locking position, and a sensing switch MU₁ provides a data signal indicating that the lock member 152 is retracted to its inoperative position.

The indexing of the turntable to bring a new magazine in position is controlled by a reciprocable latch 154 which engages a latch wheel 156, the reciprocation of the latch 154 being controlled by a cylinder MH₃ with the rear position being signalled by a sensing switch MU₃ and the forward position being signalled by a sensing switch MU₄.

Eventually a reciprocable stop 158 is provided controlled by a cylinder MH₂ with the operative stop position being signalled by a sensing switch MU₅ and the inoperative position being signalled by a sensing switch MU₂. A supplementary sensing switch MU₉ is provided to signal the correct position of a new magazine forwarded to the machine.

As will be understood this machine equipment is capable of carrying out an auxiliary programme and is as shown in FIGURE 14 wired to two connector sockets U'''ₘ₁ and H'''ₘ₁ in a similar manner as described with reference to the preceding examples. To control the cycle of the auxiliary programme an auxiliary plug-in control unit CAM is used connected through cables CUM and CHM respectively to plugs U''ₘ₁ and H''ₘ₁ to be connected to the machine equipment.

It is supposed that the latch 154 when the lock 152 and the stop 158 have been rendered inoperative has to make a first stroke which moves the empty magazine away whereafter the stop is rendered operative and the latch makes a second stroke to bring the new magazine forward to engagement with the stop 158 whereafter the lock 152 is rendered effective to lock the turntable.

This gives the following sequence of the data of the auxiliary programme:

The switch Q must be closed.
The lock 152 must be down—switch MU₁ closed.
The stop 158 must be down—switch MU₂ closed.
The latch must be returned—switch MU₃ closes.
The latch must be forwarded—switch MU₄ closes.
The stop 154 must be up—switch MU₅ closes.
The latch back again—switch MU₃ (6) closes.
The latch forwarded again—switch MU₄ (7) closes.
The lock 152 must be up—switch MU₈ closes.
OK signal for magazine—switch MU₉ closes.

And if desired as indicated a check on opening of the switch Q by closing the other part of the double switch Q'.

In accordance with the teaching in connection with the programming of the preceding examples this results in the programme chart shown in FIGURE 15 indicating that the retraction of the lock is actuated at stage number 2 and inactivated at stage number 9. The retraction of the stop is activated at stage number 3 and inactivated at stage number 6. The first stroke of the latch is activated at stage number 4 and inactivated at stage number 5, and the second stroke of the latch is activated at stage number 7 and inactivated at stage number 8.

Also the corresponding connections of the sensing or data switches in correct sequence with the terminals of the socket U'''ₘ₁ will be apparent from the preceding description and it will be understood that with the wiring shown in FIGURE 14 and with the wiring of the programme plug MM₂ of the auxiliary control apparatus CAM the auxiliary programme will be carried through when the closing of the switch Q indicates that a magazine is empty.

By an auxiliary machine equipment as shown in FIGURE 14 it may be allowable to carry out the auxiliary programme without interrupting the automatic process of the drilling machine itself, because there will still be some workpieces left in the stationary part 102a of the workpiece magazine to allow the drilling machine to run through a few complete cycles of operations without the necessity of a new magazine top part being brought into position.

In other cases of an auxiliary programme to be added to a machine it will be necessary to interrupt the machine cycle.

A further modification of the invention illustrating this possibility is shown in FIGURE 16 with the corresponding programme chart being shown in FIG. 17.

In FIGURES 16 and 17 the auxiliary programme includes the necessary steps to change the drill in response to sensing of a machine data which indicates excessive drilling time.

The auxiliary machine function members for carrying out this auxiliary programme and appertaining controls therefor are as follows:

The machine equipment of the drilling machine and the programme is supposed to be as described with reference to FIGURE 9 or 12, and the sensing switch $U_5$ which is closed in the lower position of the drill and causes the advancement of the progressive switch arrangement of the control apparatus in FIGURE 11 to stage number 6 or 12 respectively is also shown and identified as $U_5$ in FIGURE 16.

The sensing device adapted to signal excessive drilling time may be in the form of a timer 105 such as a cylinder which is connected to that inlet pipe to the drill control cylinder $H_4$ which controls the down movement through a throttle valve 107 in such a manner that the piston rod 109 moves slowly up and operates a switch $U'_5$ to be opened if the drilling time is excessive. The switch $U'_5$ is connected in series with the switch $U_5$ whereby the opening of the switch $U'_5$ will correspond to interruption of the cycle of operations at one of the stages 5 or 11 and thereby with the drill in its lower position.

A switch $BU_1$ is associated with the switch $U'_5$ to be closed simultaneously with the opening of the switch $U'_5$ and operate as a starter switch for the auxiliary programme.

In order to shift the drill a necessary step of the auxiliary programme is to raise the drill and in order to do that without interfering with the main programme upon restarting thereof a relay winding or solenoid $BH_1$ is provided as a first operating control member of the auxiliary programme to open a switch $BS_1$ which is connected in series with the solenoid $BH_4$ of the valve that belongs to the cylinder $H_4$ whereby the opening of the switch $BS_1$ as an auxiliary programme step will correspond to actuation of the drill control relay RE at one of the stages 6 or 12 in the main programme, but with the progressive switch arrangement that controls the main programme still being in stage 5 or 11.

The raising of the drill hereby effectuated closes an auxiliary sensing switch $BU_2$ of the auxiliary programme indicative of the drill having reached its top positon.

At the top of the brake spindle 170 a brake disc 172 is secured adapted to be engaged by diametrically opposite brake shoes 174 and 176 respectively of which the brake shoe 174 is rendered effective by means of a solenoid $B'H_3$ with the effective brake pressure being signalled by a sensing switch $BU_3$ that operates in response to pressure. The brake shoe 176 is rendered effective by a solenoid $B''H_3$ and the brake pressure is signalled by a pressure sensing switch $BU_4$.

The inoperative or retracted position of the pressure shoe 174 is signalled by a sensing switch $BU_{16}$ and the retracted inoperative position of the pressure shoe 176 is signalled by a sensing switch $BU_{17}$.

The drill motor 178 is supposed to be controlled by means of a traditional motor control which may include a relay. The machine function represented by the motor is referred to by $BH_2$ and no sensing is effectuated in the switching off and on of the motor.

Near the drill chuck a chute 180 is tiltably arranged movable between an inoperative position shown in full lines which is signalled by the closing of a sensing switch $BU_9$ and an operative position shown in dotted lines signalled by the closing of a sensing switch $BU_5$. The movement of the chute 180 is controlled by solenoid means $BH_4$. In the inclined position the chute is adapted to receive the drill when it is loosened. The drill is then guided by the inclined chute to a stationary chute portion 180a and the thrown out drill is signalled by the closing of a sensing switch $BU_8$.

In order to arrest the chuck 182 an engageable and disengageable dog clutch 184 is provided having a tiltable or in other manner movable member 186 the movement of which is controlled by a solenoid means $BH_5$, the operable clutch engaging position of which is signalled by closing of a sensing switch $BU_6$ and the retracted inoperative clutch disengaging position of which is signalled by the closing of a sensing switch $BU_{15}$.

To turn the spindle 170 when the chuck is arrested the brake members 174 and 176 are supported on a turntable 188 which is supported in guide plates or the like 190 and 192 and can be turned in one direction to open the chuck by a solenoid means $BH_6$ with the turning to the chuck opening position being signalled by a sensing switch $BU_7$ and the turning back to the chuck closing position being signalled by a sensing switch $BU_{12}$.

The new drill 194 is loosely supported in a cap like member 196 which is reciprocable in a vertical direction controlled by a cylinder control means $BH_8$, the top position of which is signalled by closing of a sensing switch $BU_{11}$, and the retracted lower position of which is signalled by the closing of a sensing switch $BU_{13}$.

The drill supply mechanism in addition includes a horizontal drill feeder 198 which is mounted for reciprocation between a retracted position signalled by the closing of a sensing switch $BU_{14}$ and an operative forwarded position in alignment with the chuck as signalled by the closing of a sensing switch $BU_{10}$, the horizontal reciprocation being controlled by solenoid means $BH_7$.

Eventually to provide a final signal in the auxiliary programme that the drill has been lowered to restart the drilling operation of the main programme a sensing switch $BU_{18}$ is provided to be closed in response to downward movement of the drill, i.e. movement away from the raised position in which the auxiliary programme is carried out.

As in the preceding examples the analysis of the sequence of operations shows the following stages of sensing in squence:

Stage 1: Is starter switch closed—switch $BU_1$
Stage 2: Is drill up—switch $BU_2$
Stage 3: Is brake 174 activated—switch $BU_3$
Stage 4: Is brake 176 activated—switch $BU_4$
Stage 5: Is chute 180 in position—switch $BU_5$
Stage 6: Is chuck 182 arrested—switch $BU_6$
Stage 7: Is spindle turned—switch $BU_7$
Stage 8: Is drill out—switch $BU_8$
Stage 9: Is chute returned—switch $BU_9$
Stage 10: Is feeder 198 forward—switch $BU_{10}$
Stage 11: Is drill up—switch $BU_{11}$
Stage 12: Is spindle turned back—switch $BU_{12}$
Stage 13: Is drill feeder 196 down—switch $BU_{13}$
Stage 14: Is drill feeder 198 back—switch $BU_{14}$
Stage 15: Is chuck released—switch $BU_{15}$
Stage 16: Is brake 174 free—switch $BU_{16}$
Stage 17: Is brake 176 released—switch $BU_{17}$
Stage 18: Is drill on way down—switch $BU_{18}$.

From this analysis of the sensings the connection of the sensors to the terminals of the sensing lines socket $BU'''_1$ is rendered clear in the same manner as described with reference to the preceding examples.

The sensing switches have all one side connected to the common lead $Y_B$ and are individually connected in the information signal lines to the respective terminals.

Also as in the preceding examples the machine function control means are connected to the command signal socket $BH'''_1$ with one end of the control means being connected to the common lead $X_B$ and the other end being connected in arbitrary sequence to the terminals, in the embodiment shown with the drill control to the first terminal, the motor to the second terminal and brake, chute, chuck, spindle, horizontal and vertical feeder connected to the respective terminals in the sequence here mentioned.

The wiring of the programme plug for the auxiliary control unit to control the auxiliary programme of the equipment shown in FIGURE 16 appears from the programme chart shown in FIGURE 17.

The two brake control cylinders are wired in series so as to be actuated simultaneously but have individual sensing switches to facilitate fault finding if one of them fails.

In the programme chart shown in FIGURE 17 two operations are initiated simultaneously upon movement to stage number 2, namely the movement of the drill to the top position and the switching off of the motor.

When the drill is in the top position and the switch $BU_2$ advances the control arrangement to stage number 3 the brake is activated and remains activated until stage number 17.

The next stage member 4 is reserved to sensing that the second brake has been activated and at stage number 5 the chute 180 is moved to the inclined position and released at stage number 8.

When the chute is in the correct position closing the sensing switch $BU_5$ and thereby advances the control to stage number 6, the chuck arrester is activated and remains activated until the drill feeder has returned at stage number 15.

When after fixing of thhe chuck stage number 7 is reached the spindle turning is activated to open the chuck and remains activated from stage number 7 to stage number 12.

The stages 8 and 9 are reserved to the sensings that the drill is out and that the chute has returned, and at stage number 10 the horizontal feeder 198 is activated and inactivated at stage number 14.

Upon advancement of the horizontal feeder 198 to close the sensing switch $BU_{10}$ and thereby advancement of the control to stage number 11 the vertical feeder is activated at stage number 11 and inactivated at stage number 13, the intervening stage number 12 being reserved to sensing that the spindle has been turned back again to close the chuck and secure the drill therein.

It will be appreciated that when the drill has been shifted and the drill is still in the top position, this looks as seen from the main programme accordingg to FIGURE 12 as the programme had been advanced on stage, but when the main control takes over the main programme again, the main control will still be at the same stages, i.e. either stage 5 or stage 11 as before the uncompleted drilling, so that the programme starts again where it was interrupted whereby the uncompleted hole will be duly countersunk with the repetition of the operation in one of the stages 5 or 11.

In other words this repetition corresponds to going one stage back in the main programme. Hereby it will be understood that it will be possible by means of an auxiliary programme to influence the programme which is controlled by a main control apparatus in such a manner that in the case of error or faulty operations an auxiliary equipment on the machine may by means of an auxiliary control unit cause the repetition of an operation step so as to operatively cause the main control unit to "revoke" one or a plurality of operations in order to correct for the fault whereafter the auxiliary control unit will continue to control the operations to that stage of the main programme where the "revocation" took place.

As apparent from the foregoing description, the progressive switch arrangement operates during the automatic cycle to effectively apply a voltage in sequence to the data signal line terminals $U_1$, $U_2$, $U_3$ . . . and in synchronism herewith also to apply a voltage in sequence to the single set of command signal lines $h_1$, $h_2$, $h_3$ . . . to be distributed through the distributer network or programme plug $M_2$ to the actuator lines $h_{ra}$, $h_{rb}$ . . . for the relay means RA, RB . . . which effectively operates as machine function control means having an operable and an inoperable stage each being obtainable by means of a voltage or a signal.

In an automatic system, however, it is important to be able to check that all wirings are correctly performed and that all operations and sensings will take place as planned before the machine equipment is allowed to run automatically.

It is also important that there is a possibility for quick location of faults, if any.

To this purpose I provide in combination with the circuits of the control apparatus and the machine equipment an auxiliary network adapted to be included in or connected with the circuits in a plurality of different manners. This auxiliary network has already been briefly descsibed and referred to by SN in FIGURE 4 and FIGURE 5, and the network is shown in more detail in FIGURE 18.

Basically the auxiliary network includes a manually operable stepping switch adapted to be connected with at least one of the groups of circuit lines to selectively render the lines operable so as to replace or imitate under manual control the function of the progressive switch arrangement. The auxiliary network also preferably includes indicator means to be included in one of the groups of circuit lines to effectively signal the operative condition of the lines.

In more detail in FIGURE 18 the auxiliary network includes two network portions referred to by $SN_1$ and $SN_2$ respectively.

The network $SN_1$ includes a manually operable stepping switch having a movable wiper or finger $PB_r$ movable to selectively establish contact with the plurality of contacts each of which is connected with a terminal 1(A), 2(B) . . . 7(G). The network includes a further terminal $ZO_s$ which is connected to the movable wiper or finger $PB_r$ through a push-button type switch $PB_s$.

The network portions $SN_2$ includes a plurality of open circuit lines $SH_1$, $SH_2$ . . . $SH_7$ and a line $S_x$ and a plurality of indicators such as discharge lamps $G_{1a}$, $G_{1b}$ . . . each of which is connected between a respective of the lines $SH_1$, $SH_2$ . . . and the line $S_x$.

In FIGURE 18 the network $SN_2$ is shown connected between the command signal line terminals $H_1$, $H_2$, $H_3$, $H_4$ . . . of the control apparatus and the corresponding command signal line terminals $H''_1$ . . . of the machine equipment with the line $S_x$ included as the common return line $x$.

In FIGURE 18 the group of terminals A, B, C . . . leading to the relays RA, RB, RC . . . and adapted to receive the programme plug is shown to include a terminal ZO which is connected to the positive terminal of the voltage source W.

The network portion $SN_1$ is adapted to be connected to the relay side terminals A, B, C . . . with the terminal $ZO_s$ of the network portions $SN_1$ connected to the terminal ZO.

With the network portion $SN_1$ connected in this manner it will be appreciated that as far as the command signal lines are concerned, the manually operable switch can be used to replace or imitate the operation of the progressive switch arrangement of the control apparatus so as to enable test of the relays and the machine function means for correct function. When the movable wiper $PB_r$ is manually set to select the line $h_{ra}$ and the push-button $PB_s$ is depressed, a signal will be transmitted to the relay RA which will be rendered operative and close its contact $R_a$ whereby the line $h'_1$, $SH_1$ and $h''_1$ will be rendered operative so as to thereby render the machine function $H_1$ operative. The subsequent depression of the push-button $PB_s$ will render the relay RA inoperative and thereby also render the machine function $H_1$ inoperative.

Hereby at each stage of the manually operable switch each relay and the respective machine function can be tested for correct operation, and the machine function can be adjusted. If, for example, the machine function means is in the form of a cylinder on a machine tool as shown in FIGURE 7, the movement controlled by the piston of the cylinder can be repeated as many times as wanted by operating the push-button $PB_s$, and during this repeated operation of the cylinder the solenoid valves can be flowregulated to provide for the desired speed of the operation of the function in question. Such flow-regulation is usually made by a screw driver or another suitable tool as known to those skilled in the art.

The networks $SN_1$ and $SN_2$ may be in the form of a separate unit to be plugged in as a starting aid or may, if desired, be permanently included in the circuits of the control apparatus.

It will be appreciated that these networks also constitute an aid to locate faults, if any, during the automatic operation. If for example during automatic operation of the machine the cycle stops, the command signal line which is effective at that moment can be easily located by the signal provided from the respective indicator lamp.

FIGURE 19 illustrates a modification of the manually operable switch arrangement shown in FIGURE 18 and includes in an auxiliary network portion $SN_3$ a manually operable switch having a movable finger or wiper $PU_1$ adapted to engage a plurality of contacts connected through lines $S_{u1}$, $S_{u2}$ . . . which are connected to terminals adapted to be connected to the terminals of the sensing signal lines $u'_1$, $u'_2$ . . . of the control apparatus. The network $SN_3$ further includes a common line $y_s$ which is connected with the movable wiper $PU_1$ and which includes a push-button switch PSU and is adapted to be connected to the y-terminal of the group of sensing signal lines.

In FIGURE 19 the programme plug is shown inserted in the control apparatus wired as the programme plug of FIGURE 11.

It will be understood that with the connection of the auxiliary network portions as shown in FIGURE 19 each of the sensing signal lines can be selected by appropriate setting of the manually operable switch and the line selected can be rendered operative to imitate the operation of the corresponding sensing switch of the machine equipment by pressing the push button PSU.

It will easily be understood that with the circuit arrangement connected as shown in FIGURE 19 not only the relays and the machine equipment can be tested for correct operation, but also the progressive switch arrangement and the wiring of the programme plug can be tested for correct operation and wiring, respectively, because at each selected stage of the manually operable switch $PU_1$ the operation of the push-button PSU will cause the progressive switch arrangement to be advanced one stage precisely as in response to the operation of the respective sensing switch on the machine equipment which during the automatic operation is included in the sensing line in question.

It will also be understood that the circuit arrangement shown in FIGURE 19 can be used for easy and precise location of faults during automatic operation, for example by including in a suitable manner an indicator named ISL. In FIGURE 19 this lamp is shown shunted across the push-button switch PSU and is supposed to be a low voltage discharge lamp which will light in response to application of voltage, but which will not be able to draw sufficient current to operate the indexing means of the progressive switch arrangement.

In such event the auxiliary network arrangement shown in FIGURE 19 can be used to locate faults occurring during the automatic operation of the working machine by disconnecting the sensing signal line cable from the socket U' and plugging in the auxiliary network $SN_3$ and thereafter manually turning the movable finger $PU_1$ until the indicator lamp ISL lights. In such event the stage of the manually operable switch will be precisely that stage at which the progressive switch arrangement has stopped during the automatic cycle.

As mentioned it was supposed that the programme plug was wired as shown in FIGURE 11 to run the machine shown in FIGURE 9 through its automatic cycle. Assuming that the operation of the network $SN_3$ indicates that the machine has stopped at stage 11, an inspection of the programme chart shown in FIGURE 10 indicates immediately that the prerequisite for advancing the progressive switch arrangement to stgae number 12 is that the drill must be down, and that the fault must be that the drill has not been sufficiently down to operate the sensing switch $U_{11}$. With the equipment shown in FIGURE 12 it is therefore easy to inspect the machine to ascertain whether there is anything faulty with the sensing switch $U_{11}$, or the activation of the cylinder $H_4$ to move the drill down has failed.

If neither of these faults have occurred the fault must be in the control apparatus, either due to the fact that the corresponding control relay RE has failed or that the indexing means S has failed.

Since, however, the control apparatus is a plug-in control it is easy to disconnect the plug-in control from the machine, connect a new control apparatus and plug the programme plug into the new control apparatus. If thereafter the machine will still not continue its operation at stage number 11, the fault must be either in the command signal line number 5 or in the sensing signal line number 11 on the machine equipment, and it will thereafter have to be inspected whether there is a defect soldering from one of these lines.

As apparent from this indication of any easy way of fault-finding it will be appreciated that this is also due to the fact that the system according to my invention provides for each stage of the progressive switch arrangement being an unambiguous expression of the conditioning of the entire system to sense each prerequisite condition for allowing any operation to be carried out.

This provides for a substantial simplification of fault-finding circuitry inasfar as there is only one function to be imitated or duplicated, i.e. the function of the sensing switch means.

As will be understood the auxiliary network as illustrated in FIGURE 19 in addition to being used as a fault-finding aid can be used as a safe starter network to check the correct function of the entire system, except the sensing switches.

It will be appreciated, however, that the network $SN_3$ can be duplicated so as to also include a check on the correct operation of the sensing switches under manual control, such as illustrated in FIGURE 20, which illustrates an auxiliary network $SN_4$ having a manually operable stepping switch with the movable wiper or finger $PU_1$ and its contacts included in one deck and in addition thereto a second deck comprising a movable finger $PU_2$ mechanically coupled to the finger $PU_1$ by suitable means indicated by CM and adapted to engage a series of contacts each of which is connected to one of a plurality of lines $S'U_1$, $S'U_2$ . . . which are adapted to be connected with the sensing lines of the machine equipment $U''_1$, $U''_2$ . . . The movable finger $PU_2$ is connected with a suitable voltage source W'' included in a common line $y'_s$ together with a signal lamp $ISL_1$.

By way of example, using the auxiliary circuit arrangement shown in FIGURE 20 with a general automation arrangement as hereinbefore described with reference to FIGURES 19 and 11, it will be understood that the complete automation equipment can be inspected stagewise under manual control with respect to correct function of the entire equipment including the control apparatus by stagewise manual selection of each of the sensing lines and operation of the push-button switch PSU.

The mode of use and operation of the auxiliary network system as shown in FIGURE 20 is substantially as follows:

When with the movable finger of the manually operable switch at stage number 1, the push-button is operated the progressive switch arrangement will be advanced to stage number 2, and the signal lamp $ISL_1$ will indicate that the starter switch on the machine equipment as well as the workpiece control switch $U'_1$ in FIGURE 12 in series therewith are closed.

The manually operable switch is then advanced to stage number 2, and the push button PSU operated. This will cause a command signal to the relay RB, initiation of the forward transport as controlled by the cylinder $H_2$ in FIGURE 12, as well as advancement of the progressive switch arrangement to stage number 3. The manually operable switch is left at stage number 2 until the forward transport has been advanced and closes the middle stop sensing switch $U_2$, the correct closing of which is signalled by the lamp $ISL_1$.

The manual switch is thereafter advanced to stage number 3, and the push-button PSU operated which will cause energization of the relay RA and thereby initiation of the next machine function as illustrated by the programme charts shown in FIGURE 10 with proper indication of the operation of the sensing switch $U_3$.

From this brief description of the first stages of the use of the arrangement shown in FIGURE 11 it will readily be understood that the entire programme as laid out by the programme chart shown in FIGURE 10 can be checked stage by stage under manual control with full survey of the programme and check on each correct function before the plug-in control apparatus is connected with the working machine to enable automatic function thereof.

While the foregoing description was made with reference to specific embodiments illustrating the particular layout of the stepping switches, the basic nature of the automation cycle control system according to my invention may be explained with reference to FIGURE 21 which illustrates in block diagram the basic elements of the system and the respective functions thereof.

As apparent from the foregoing description and the manner in which the interlocking of data and functions is achieved, it will be apparent that the function of the system is based upon rendering each single one of the plurality of command signal lines effective in sequence only in response to coincidence of the operation of a data signal switch means and the presence of the progressive switch arrangement at a predetermined correlated stage.

Seen from another aspect, the progressive switch arrangement effectively provides a memory which serves the purpose of effectively counting the number of data signals which are produced only in response to the coincidence hereabove mentioned, and of which one coincidence precedes each stage. In addition, the memory means effectively provided is linked with the means for switching the progressive switch arrangement from one stage to the next following stage.

In FIGURE 21 a plurality of machine function means $H_1$, $H_2$, $H_3$ . . . are shown in block form and are of any suitable construction as described hereinabove and adapted to be controlled by command signals transmitted through the command signal circuit lines $h_1$, $h_2$ . . . . The plurality of data signal means $U_1$, $U_2$ . . . are also shown in FIGURE 21 which transmit data signals through the data signal circuit lines $u_1$, $u_2$ . . . described hereinabove. The data signal means may thereby be of any suitable construction conforming to the functional requirements capable of signalling prerequisites for the allowability of proceeding with steps of the automatic process.

In FIGURE 21 the control switch arrangement is indicated as a block R in dash lines and includes a plurality of components to be described more fully hereinafter.

The coincidence operation mentioned hereabove is in the block diagram of FIGURE 21 symbolized by a coincidence means designated by the reference CO, the programming, information and memory means being designated by the reference PIME, and the command signal means being designated by the reference CS.

It will readily be appreciated that the stepping switch wiper $R_1$ of FIGURE 2 effectively provides a coincidence circuit arrangement since a data signal transmitted through any one of the data signal lines $u_1$, $u_2$ . . . will only be passed on to the remainder of the control circuit if the rotary switch wiper $R_1$ is actually at that stage of the rotary switch which corresponds to the respective data signal means that produces the particular data signal which is transmitted through the corresponding data signal line.

In other words, coincidence of the transmission of a data signal with the position of the rotary switch $R_1$ is a prerequisite to condition the control apparatus to provide a control output in the coincidence means in response to a command signal. In the absence of such coincidence the command signals are completely ineffectual.

It is also obvious that the control unit requires a command signal means producing the corresponding command signal as determined by the control unit when a data signal is received in the proper position or at the proper stage of the coincidence means. This is obviously one of the functions carried out by the second rotary wiper $R_2$ in FIGURE 2 and is obtained by the synchronous operation of the wipers $R_1$ and $R_2$ effectively also producing a sequential distribution to the different command signal lines $h_1$, $h_2$ . . . as a result of the general operation of the control apparatus.

In addition, the effective memory as represented by the digital counting of the data signals comes into the picture and operates to sequentially select or render operable the data signal lines. The memory means makes possible a comparison between the programming information and the operation of the coincidence means and the command signal means. To illustrate that these functions are actually and in effect produced by the particular arrangement of FIGURE 2 herein it is only necessary to realize that programming information is effectively stored in the control apparatus by the particular interconnection of the various circuits thereof. The memory function is automatically performed by the stepping switch arrangement which in effect acts as a digital counter memorizing the total number of switching operations that has preceded each new switching operation and each of which is effectively controlled by the memory means. In other words, the stepping switch arrangement automatically performs the memory function by the stepping operation thereof controlled by the data signals, since at any stage of the progressive switch arrangement or stepping switch it will find itself in a position which represents the total number of steps that has been carried out before.

It is believed that the foregoing analysis of the basic elements of the automation system according to my invention follows clearly from the description of the operation of FIGURE 2, since all of the functions ascribed to the means of FIGURE 21 are clearly present and inherently produced by the system of FIGURE 2.

The control system of FIGURE 2, however, effectively produces certain further control functions. In effect these functions provide what might be schematically indicated as a feed-back shown as a line FB, FIGURE 21, between the programming information and memory means PIME and the coincidence means CO. This is an inherent feature of the stepping switch $R_1$ of FIGURE 2, and the interconnection of the various circuits performing the function described with reference to FIGURE 2, since each time a data signal is passed by the coincidence means CO the wiper $R_1$ of FIGURE 2 is also advanced one step which in effect means that the transmission through the coincidence means CO to the programming information and memory means PIME selectively causes a feed-back to the coincidence means so as to condition the same in accordance with the information stored in the memory means for the next stage of operation of the control cycle.

Such selective feed-back means is obviously obtained in FIGURE 2 by the fact that the stepping switch wiper $R_1$ is advanced one step each time a received data signal is rendered effective to actuate the stepping switch actuator S to move the stepping switch one step. By thus advancing the stepping switch step by step, the coincidence means $R_1$ of FIGURE 2 is selectively and effectively reset or conditioned by the inherent feed-back and is thereby conditioned for the next phase or stage of the operation of the automation control cycle.

While the foregoing describes the present invention by reference to a schematic block diagram, the layout of the system and the elements thereof may also be analysed in terms of symbolic logic utilizing "and gates" or "coincidence-gates" to indicate the simplicity.

It will readily be appreciated that the coincidence operation of FIGURE 2 is constituted by the series connection between the data signal switch which is included in a data signal line and the corresponding position or stage of the rotary wiper $R_1$ which renders the data signal line in question operable. In fact, however, the progressive switch arrangement at each stage represents a switch in series with a respective data signal switch. Basically an "and gate" is a circuit in which two devices such as two On-Off-type switches are used, both of which have to be in the On-position or closing position thereof to effectively close the "And gate" and a series connection of two switches as illustrated in FIGURE 2 is one of the simplest forms of an "And gate." It is quite obvious that hereby the series connection of the rotary wiper $R_1$ and a respective data switch can be symbolized by an "And gate" so as to provide a simplified illustration using symbol logic, showing the sensing signal lines as a plurality of individual lines each including one "And gate."

In addition, however, the effective memory as represented by the digital counting of the data signals, i.e. the number of "And gates" which has been effectively operated comes into the picture and operates to sequentially select or render operable the data signal lines or "And gates."

Functionally, however, upon the operation of one "And gate" which is included in a data signal line, the "And gate" effectively provides two signals, namely a command signal to the machine function means and a signal to the memory means to effectively store therein one further numerical value. When using symbolic logic this can be illustrated by providing the "And gate" with two outputs, one for signals to the machine function means and one for signals to the memory means.

In operation, however, an "And gate" is only used to provide these two output signals once during each complete cycle, even in the event that the same sensing switch may be used two or even more times as illustrated in FIGURE 12, because the other component of the "And gate" at the second occurrence of the sensing switch means is a different stage of the progressive switch means.

As explained with reference to the block diagram of FIGURE 21, a feed-back FB is effectively provided from the memory means to the coincidence means. When utilizing symbolic logic this means that a selective feed-back signal is effectively provided to the "And gate" means.

It is obvious that this leads to a simplified symbolic logic diagram as shown in FIGURE 22 in which the functional components in each data signal line $u_1$, $u_2$, $u_3$ . . . are in the form of an "And gate" $AG_1$, $AG_2$ . . . each of which as shown with respect to the "And gate" $AG_1$ has an input $i$ to which the information or sensing signal I is applied and an output $h$ for the command signal and a second output $m$ connected to the memory means for sending a signal to the memory means to be stored therein in the form of the sum of information signals, and a second input $mi$ connected to the memory means for selectively receiving therefrom a feed-back signal which represents a command to the "And gate" in question that it will be ineffective and the next following "And gate" be rendered effective.

It is quite obvious that each data signal switch $U_1$, $U_2$ . . . in series with the respective switching stage of the deck $D_1$ of FIGURE 2 effectively provides such an "And gate" having an input and an output as both the particular data signal switch and the position of the wiper $R_1$ must be such that the circuit is energized to render the control system effective to transmit a command signal.

It is also obvious that the stepping switch deck $D_2$ in FIGURE 2 due to the synchronous movement of the wipers $R_1$ and $R_2$ effectively provides output of the "And gate" which is rendered effective to supply a command signal to the respective machine function means.

It is also obvious that in addition to the command signal produced by the arrangement of FIGURE 2, a second signal separate from the command signal is applied to the indexing means S which effectively is a part of the memory because it operates synchronously with the stepping switch so as to render each stage of the stepping switch effective as a sub-memory as indicated by $PIME_1$, $PIME_2$ . . . in FIGURE 22.

It is also obvious that when the sub-memory means $PIME_1$ of FIGURE 22 has received a signal to be stored in the memory as a hold to effectively provide data logging in the memory, this corresponds to the progress of the stepping switch to the next following stage of FIGURE 2 at which the next stage represents the next sub-memory $PIME_2$ of the FIGURE 22 conditioned for data logging subject to the proper operation of the second "And gate" $AG_2$. It is obvious from the description of the arrangement of FIGURE 2 that the advancement of the progressive switch arrangement from one stage to the next following stage also conditions the second "And gate" for proper operation and that this conditioning can be symbolised by symbolic logic by the feed-back loop $FB_2$ from the first sub-memory which corresponds to the first stage of the progressive switch arrangement to apply a conditioning signal to the second "And gate" as symbolized by the feed-back loop $FB_2$ to the input $mi$ of the second "And gate" $AG_2$.

To illustrate the similarity of the logic circuitry of FIGURE 22 with the system of FIGURE 2, the starter switch $U_1$ is shown included in the memory means connected with the input $mi$ of the first "And gate" $AG_1$ to provide that input signal to the "And gate" $AG_1$ which conditions the "And gate" for operation.

From the foregoing it will be obvious that the system of FIGURE 2 provides a progressive switch arrangement having a plurality of switching stages each of which represents a numerical value and all of which effectively provide memory means. The circuit arrangement which includes the progressive switch arrangement effectively provides a plurality of command signal transmission circuit means which are operable to be rendered effective sequentially and exclusively in response to the coincidence of the connection of a predetermined stage of the progressive switch arrangement and the operation of a pre-determined sensing switch, the series connection of which effectively provides an "And gate" having a sensing signal input and a command signal output. The stages of the progressive switch arrangement effectively provide conditioning means to selectively condition only one of the "And gates" for operation. The stage-by-stage selection of the lines effectively provides the second input of the "And gates." Furthermore, the connection with the indexing means S effectively provides a data logging output from the "And gates," and the connection with the circuit arrangement effectively and selectively provides the numerical values and thereby stores the sensing signals in the memory means.

While in the foregoing description with reference to the specific embodiments illustrating the particular layout a stepping switch having two decks has been shown, it will be obvious that it is only the stepping function effectively provided by the deck $D_2$ to render the single set of command signal lines effective in sequence which is necessary to obtain the simplicity of the layout of my system, and that any other equivalent means operable as sequential distributor may be used within the scope of the invention.

The effective operation must be seen therein that the command signal lines must be individually and sequentially conditioned for operation as effectively provided by the stages of the progressive switch arrangement, and that a line such conditioned is only rendered effective in response to an effective "And gate" operation, i.e. the coincidence hereinbefore mentioned with effective transmission of the command signal and effective shifting of the numerical values to provide data logging and thereby conditioning of a subsequent line for proper operation.

As stated hereinbefore the numerical control according to my invention can be applied to any working machine by laying out operations or machine functions and a plurality of sensings each of which is a prerequisite for the progress of functions with each prerequisite being stored as a numerical value or discrete step in the memory means whereby the layout, the interlocking of data and functions as well as fault-finding become unambiguous at any stage.

Though the specific embodiments illustrated refer to a drilling machine, it will be understood that within the scope of the invention it is possible to provide an automatic cycle on any other machine to provide an automatic process. In a welding machine, for example, the usual manual operation comprising the process of welding two workpieces together includes mounting of the two workpieces in a holder, putting the holder in position between the welding electrodes, activating the welding machine, removing the holder when the welding has been completed and eventually opening the holder and then repeating the operation.

This type of process can easily be automated by using a stepwise movable turntable in similarity with the magazine turntable of FIGURE 14 having a plurality of holders for the workpieces. The automatic cycle would then be after loading of the holders with the workpieces to move the turntable through a predetermined angle, to bring a holder into alignment with the welding electrodes, bringing the electrodes together to perform the welding, and thereafter moving the welding electrodes to their inoperative position, and eventually moving the turntable to the next following stage.

This would leave to the operator only to load the holders with the workpieces and remove the workpieces from the holders when they have been welded.

This is another example of a simple way of laying out an automation, and I have found that such simple equipment added to a standard welding machine nearly doubles the capacity of the machine with a single operator.

It will be obvious, however, that in similarity with the parts shown in FIGURE 9 added to the machine of FIGURE 6 it will also in the case of a welding machine automated in the manner briefly described hereabove be possible to add automatic loading of the holders and automatic opening and removal of the holders after the welding to the machine equipment to be controlled by means of the same standard control apparatus only with a rewired programme plug.

Though in the foregoing the invention has been described in great detail with reference to various practical embodiments, it will be understood that the invention is not limited to the embodiments shown and described with reference to the accompanying drawings, and that such modifications will be possible within the scope of the invention which effectively provide means substantially equivalent to those hereinbefore described in the control apparatus itself as well as in the machine equipment.

I claim:

1. In control means for running a working machine having a plurality of electrically controlled operation-performing members controlled by command signals and included in a plurality of command signal lines, and a plurality of data signal means adapted to produce data signals and included in a plurality of data signal lines through a cycle following a predetermined sequence comprising: an electrically controlled counter device effectively providing a plurality of stages, means operatively connecting said counter device with said data signal lines to effectively switch said counter device exclusively by respective data signals of said data signal means and exclusively upon coincidence of a respective stage and of a respective one of said data signal means, said operation performing members each having a first and a second operating condition and being operable to be selectively switched from said first to said second operating condition and vice versa in response to sequential command signals, and means operable exclusively at a predetermined number of stages of said counter device to effectively provide a respective command signal for a correlated operation-performing member through a corresponding one of said command signal lines.

2. In sequence control means for a working machine having a plurality of electrically controlled operation-performing members and a plurality of data signal members adapted to produce data signals, on-off type means operable to render said operation performing members alternately effective and ineffective by consecutive electrical signals, each of said on-off means having two operating conditions and remaining in a given condition until receipt of the next electrical signal to change from one condition to the other and vice versa, sequence control means having a plurality of effective stages and being operatively connected with said on-off type means and operable to effectively apply consecutive electrical signals thereto in a predetermined sequence, and means including connecting means between said members, said on-off type means and said sequence control means and operable to switch said control means from each stage to the next following stage exclusively in response to data signals from said data signal members and in response to the coincidence of predetermined respective stages of said control means and operation of respective data signal members.

3. In a control system for automatically providing a predetermined cycle of a series of operations of a working machine having a plurality of electrically controlled operation-performing means and a plurality of sensing means adapted to produce electrical information signals in a predetermined sequence throughout said cycle of operations; a digital counter device including indexing means, means operatively connecting said sensing means with said digital counter device to effectively render said information signals available as digits of said counter device only in information signal sequence, control means operatively connected with said operation-performing means to alternately render the same effective and ineffective by consecutive electrical signals including means for said operation performing means each having two operating conditions and normally remaining in a given condition until receipt of the next consecutive electrical signal to change from one condition to the other and vice versa, and means operatively connecting said counter device with said control means for said operation-performing means to effectively apply consecutive electrical signals thereto and thereby provide programming of said operation cycle at a plurality of predetermined digits of said counter device.

4. In a control system according to claim 3, wherein the last-mentioned connecting means includes means for selectively distributing said electrical signals to said operation-performing means to determine the sequence pattern of said programme.

5. In a control system according to claim 4, in which at least two timely spaced electrical signals are applied to each operation-performing means to produce distinct control functions.

6. In a control system for programming an automatic process including a series of operations of a working machine having a plurality of machine function means and electrical actuating means therefor adapted to be controlled by command signals and included in a plurality of command signal lines and a plurality of sensing means adapted to produce electrical information signals corresponding to stages of said machine process and being included in a plurality of information signal lines comprising: a digital counter device effectively providing a plurality of discrete steps including indexing means operable to provide said steps, means operatively connecting said information signal lines with said digital counter device to operate said indexing means only by said information signals and only upon coincidence of a respective counter step and a respective machine process stage, and means including bi-stable control means effectively providing two operating conditions and operatively connecting said counter device with said actuator means for shifting said bi-stable control means from one to the other operating condition and vice versa only upon application thereto of consecutive command signals to thereby effectively provide programming of said automatic process at a plurality of respective predetermined steps of said counter device.

7. In a control system for automatically providing a predetermined cycle of a series of operations on a working machine having a plurality of electrically controlled operation performing means and a plurality of sensing means adapted to produce electrical information signals in a predetermined sequence throughout said cycle of operations comprising: a progressively operable electrical counter device having a plurality of stages capable of providing counting, means operatively connecting said sensing means with said counter device and operable to feed only said information signals into said counter device in the sequence in which they are produced to provide counting thereof, means operatively connected with and operable to derive from said counter device electrical signals operable to be used as command signals at a plurality of the stages, and means operatively connected with said last-mentioned means and operable to programme said operations by means of said derived signals including means for determining the initiation and the termination of the operation of a respective machine function means by separate timely spaced command signals.

8. The combination according to claim 7, wherein operation performing means are solenoid valve controlled operation-performing members.

9. The combination according to claim 8, wherein the last-mentioned connecting means includes plug-in circuit means between the solenoid valves and said second-mentioned connecting means.

10. In a control system for programming an automatic cycle of operations of a working machine having a plurality of machine function control means and electrical actuators therefor, and a plurality of sensing means adapted to be rendered effective to produce electrical information signals responding to the progress of said operations: means operable to effectively control the initiation and termination of a respective machine function by consecutive, timely spaced electrical signals, a progressively operable electrical switch device having a plurality of discrete stages, circuit means including a plurality of information signal lines each including only one of said switch stages and one of said sensing means, means operable to render said lines operative in sequence only in response to simultaneous occurrence of a predetermined stage and operation of a respective sensing means to provide digital counting of said information signals, means operable to derive from said switch device separate timely spaced electrical signals operable as command signals for said control means to initiate and terminate a respective machine function at predetermined ones of said discrete stages, and plug-in type means for selectively determining the sequence pattern of said programme.

11. For use with a working machine having a plurality of sensing means operable to produce information signals following a predetermined programme sequence and a plurality of operation means with electrical actuators therefor and being capable of performing a predetermined machine programme when actuated by electrical command signals in predetermined sequence: a control apparatus including an electrical indexable digital counter means in which numerical values change in discrete steps and having electrical indexing means, means operable to feed only said information signals into said indexing means to effectively provide a plurality of numerical steps responding to the sequence of said information signals in said predetermined programme sequence, and means in said control apparatus operable to derive said command signals from said counter means at predetermined discrete steps thereof, and means operable to distribute said command signals in such predetermined sequence to said actuators for said operation means correlated to said discrete steps that said command signal sequence corresponds to said predetermined programme sequence including means for alternately initiating and terminating the operation of a respective actuator only at different ones of said discrete steps and in response to separate timely spaced command signals.

12. In control means for use with a working machine having bi-stable machine function means controlling a plurality of machine functions and adapted to be actuated by electrical command signals and data signal means operable to produce data signals indicative of the progress of the operating cycle of machine functions comprising in combination: a progressively operable switch means effectively providing a plurality of stages representing numerical values, means operable to shift said switch means only in response exclusively to one single predetermined coincidence of a data signal and the presence of a correlated stage of said progressively operable switch means to effectively provide data logging represented by said numerical values, and data logging responsive means operable to provide a command signal to actuate at least one of said machine function means, and each machine function means having two distinct operating conditions and normally remaining in a given condition until receipt of the next consecutive command signal to change from one to the other condition and vice versa.

13. In control means for use with a working machine having machine function means controlling a plurality of machine functions and adapted to be actuated by electrical command signals and data signal means operable to produce data signals indicative of the progress of the operating cycle of machine functions comprising in combination: a progressively operable switch means effectively providing a plurality of stages representing numerical values, means operable to shift said switch means only in response exclusively to one single predetermined coincidence of a data signal and the presence of a correlated stage of said progressively operable switch means to effectively provide data logging represented by said numerical values, control means operatively connected with said machine function means and operable to render said machine function means alternately effective and ineffective by consecutive timely spaced command signals, data logging responsive means operable to provide consecutive command signals at consecutive stages of said switch means, and means operable to effectively apply said command signals consecutively to said control means to initiate and terminate said machine functions in predetermined timed sequence.

14. In control means for automatically providing programming of a plurality of machine functions controlled by electrical actuator signals to be applied to a plurality of electrically controlled machine function means governed by a predetermined pattern of electrical information signals produced by a plurality of sensing devices: a progressively operable electrical switching device having a plurality of stages, a plurality of electrical information signal circuit means, each including a predetermined stage of said switching device and adapted to be connected with at least one of said sensing devices to effectively provide "and gate" means operable only in response to the actuation of the correlated sensing device and the simultaneous occurrence of the respective stage, means operatively connecting said information signal circuit means to said switching device to effectively switch said switching device only at said simultaneous condition, a plurality of actuator signal circuit means, means operatively connecting said actuator signal circuit means with said switching device to provide predetermined stage-responsive programming of said machine functions, and control means in said actuator signal circuit means operable in response to receipt of discrete consecutive signals to alternately provide initiation and termination of a respective machine function.

15. In control means for use with a working machine having machine function means adapted to be actuated by electrical command signals and data signal means operable to produce data signals indicative of the progress of sequential machine functions in combination: control means having on-off-operation conditions and operable to change from a pre-existing to the next condition and vice versa only in response to receipt of an input signal and operable to thereby produce said command signals, a progressively operable switch means effectively providing a plurality of stages representing numerical values, means operable to shift said switch means only in response exclusively to one predetermined coincidence of a data signal and a correlated stage of said progressively operable switch means to effectively provide data logging represented by said numerical values, and data logging responsive means operable to provide an input signal to at least one of said control means to selectively render said control means operable to initiate and terminate at least one of said machine functions only in response to timely spaced separate ones of said input signals and in correlation to the on-off-operations of the respective control means.

16. In a control system for use with a working machine having machine function means adapted to be actuated by electrical command signals and data signal means operable to produce data signals indicative of the progress of sequential machine functions in combination: control means having on-off-operation conditions and operable to change from a pre-existing to the next condition only in response to receipt of an input signal and operable to produce said comand signals in response to on-conditions, a progressively operable switch means effectively providing a plurality of stages representing numerical values, means operable to shift said switch means only in response exclusively to one predetermined coincidence of a data signal and a correlated stage of said progressivey operable switch means to effectively provide data logging represented by said numerical values, and stage responsive means operable at one stage to provide a signal to at least one of said control means to render said control means operable to initiate said machine function, and at a subsequent stage to provide a signal to said control means to render it operable to terminate said machine function.

17. A cycle control for working machines, comprising a plurality of signalling means effectively producing condition-representative data signals indicative of the progress of the working machine in the operating cycle, a plurality of machine function means adapted to be actuated by command signals and operative to control the operating steps of the working machine, progressively operable control means having a plurality of effective operating stages representing numerical values and effectively providing memory means, and indexing means for said control means operable to effectively provide consecutive stages thereof, means operatively connecting said machine function means disposed in a first single set of electrical command signal circuits, and said signalling means disposed in a second single set of electrical data signal circuits with said progressively operable control means to effectively condition said indexing means to provide staging of said progressively operable control means only in response to one single predetermined coincidence of a data signal and the presence of a correlated operating stage to select the subsequent numerical value of said progressively operable control means effectively producing command signals by said control means at consecutive stages thereof, means operable to render said machine function means alternately effective and ineffective by consecutive command signals, and means in said first set of signal circuits to distribute respective command signals to control said operating steps.

18. In control means for automatically providing programming of a plurality of machine functions controlled by electrical actuator signals to a plurality of electrically controlled machine function means following a predetermined pattern of electrical information signals produced by a plurality of sensing devices in combination: a progressively operable electrical switching device having a plurality of stages, a plurality of electrical information signal circuit means, each including a predetermined stage of said switching device and at least one of said sensing devices to effectively provide "and" gate means operable only in response to the simultaneous actuation of a sensing device included in one of said circuit means and the occurrence of the respective stage, means operatively connecting said information signal circuit means with said switching device to effectively switch said switching device in response to said simultaneous condition only, a plurality of actuator signal circuit means and means operatively connecting said actuator signal circuit means with said switching device and said machine function means to provide predetermined stage-responsive programming of said machine functions by initiating and terminating the operation of each machine function means at two different stages of said switching device and only in response to separate timely spaced actuator signals.

19. In a numerical control for a working machine having a plurality of electrically controlled machine function means each adapted to be rendered effective by command signals and a plurality of data signal means each operable to produce a data signal indicative of a prerequisite condition for further progress of operations: a plurality of data signal lines each effectively including one of said data signal means, a plurality of command signal lines each including a machine function means, a progressively operable switch arrangement with indexing means therefor and effectively providing a plurality of discrete switch steps representing numerical values effectively and each being operable as memory means for the number of preceding switch steps, and means operatively connecting said switch arrangement and indexing means therefor with said data signal lines and said command signal lines to effectively provide in each line an "and" gate means operable exclusively in response to simultaneous operation of the occurrence of a discrete switch step and the operation of the data signal means included in the line in question, each "and" gate means having a first input to be rendered effective only in response to the operation of said "and" gate means upon said simultaneous occurrence and a second input operable upon receipt of a selective signal from said memory means to render said "and" gate means ineffective and consecutively condition a further "and" gate for operation, each of said "and" gate means having a first output operable to effectively index said switch arrangement only in response to the operation of said "and" gate means upon said simultaneous occurrence and a second output operable to selectively condition said command signal line for transmitting a command signal to the respective machine function means.

20. For use with a working machine having a plurality of machine data sensing devices operable to produce electrical data signals indicative of prerequisite conditions for process steps throughout a predetermined programme and a plurality of electrically controlled machine function means operable to perform said programme when actuated by electrical command signals in predetermined sequence, a control apparatus comprising: means producing a potential, a plurality of data signal lines each adapted to be connected to include one of said sensing devices, a counter device operatively connected with said data signal lines to apply a potential in sequence to said data signal lines, circuit means including said counter device and operable to shift said counter device only in response to the closing of said circuit means through a line to which a potential is effectively applied upon a respective sensing device included in said line simultaneously being rendered effective to allow passage of electrical current therethrough, whereby said counter device is selectively shifted from one stage to the next following stage exclusively by said data signals to provide counting of said data signals expressed by discrete stages, each of which expresses the proper operation of sensing devices through the sequence preceding each stage, and a plurality of command signal lines each adapted to be connected to include one of said machine function means, and circuit means operatively connecting said command signal lines to said counter device to effectively apply a potential to each of said command signal lines in predetermined sequence for rendering said machine function means effective and ineffective in said predetermined sequence in response only to consecutive signals in the form of said potential.

21. The combination according to claim 20, wherein said circuit means include bi-stable relay means having an operable and inoperable operating condition each obtainable by the sequential application of said potential signals and distributor circuit means operatively connecting said relay means to said counter device.

22. In an automation system for running a machine having a plurality of electrically controlled operation-performing members adapted to effect at least a first and a second machine function and being included in first and second circuit means respectively, and a plurality of data signal means adapted to produce data signals through a cycle following a predetermined sequence comprising: progressively operable control means having a plurality of circuit establishing stages, means operatively connecting said control means with said operation-performing members as well as with said data signal means, said connecting means being operable to provide advancement of said control means exclusively in response to data signals and including means to establish said first circuit means to render the operation-performing member thereof operable to render said first machine function effective at one stage of said control means and means to establish said second circuit means to render the operation-performing member operable to effect said second machine function effective at a subsequent stage of said control means, means operable to effectively provide a predetermined data signal prior to said subseqeunt stage of said control means indicative of a machine condition which obviates said second machine function and including switch means operable to interrupt said second circuit means at said subsequent stage to render the respective operation-performing member of said second machine function inoperative at said subsequent stage of said control means.

23. In a numerical programme control for use with a working machine having a plurality of sensing means operatively included in a plurality of first signal lines and being operable to produce information signals, and a plurality of operation means with electrical actuators therefor operatively included in a plurality of second signal lines and being capable of being rendered effective and ineffective by means of electrical command signals through said second lines comprising: a digital counter means having electrically controlled indexing means and operable to effectively provide a plurality of numerical values each being represented by a discrete step, means operatively connecting said digital counter means and said first signal lines to effectively index said counter means exclusively by said information signals and exclusively responsive to coincidence of the operation of a predetermined sensing means and the presence of a respective of said discrete steps, means operatively connecting said counter means and said second signal lines, means operable to derive said command signals from said counter means and to distribute said command signals in predetermined sequence to said electrical actuators for said operation-performing means, a sensing device included in said sensing means operable to effectively sense a prerequisite condition which obviates the operation of a predetermined one of said operation means, and means operable in response to the effective operation of said sensing device to by-pass said operation means.

24. In an automatic system for running a machine having a plurality of electrically controlled operation-performing members adapted to effect at least a first and a second machine function and a plurality of data signal means adapted to produce data signals through a cycle following a predetermined sequence comprising: a progressively operable control means having a plurality of stages, further means for producing a potential, a plurality of data signal lines operatively connected to said control means to apply a potential from said further means in sequence to said lines, circuit means operable to shift said control means only in response to the operation of a data signal means in a line to which a potential is effectively applied, a plurality of command signal lines each including one of said operation-performing members, means operatively connecting said command signal lines to said control means to apply a potential from said further means in sequence to said command signal lines operable to render respective operation-performing members effective, and means for selectively rendering a given data signal preceding said second machine function operable to interrupt the means for applying a command potential to the respective command signal line coordinated to the operation-performing member of said second machine function.

25. In an automation system for running a machine tool having tool means adapted to perform a machining operation on a workpiece and a plurality of electrically controlled operation performing members adapted to effect a machine function including said machining operation and a plurality of data signal means adapted to produce data signals through a cycle following a predetermined sequence: a progressively operable control means effectively providing a plurality of discrete stages representing numerical values and being operatively connected with said operation performing members and said data signal means to render respective operation performing members effective and ineffective in response to data signals, means for effectively adjusting said tool means to perform said machining operation with a desired tolerance, gauging means operable to gauge said workpiece after said machining operation to indicate deviation from said desired tolerance, and means connected with said gauge means operable in response to the presence of said desired tolerance to render said control means ineffective to adjust said tool adjustment.

26. In an automatic system for running a machine through a predetermined cycle which includes a plurality of machine functions controlled by respective electrically controlled operation-performing members rendered effective in response to feed-back data signals from a plurality of data signal means, comprising: an auxiliary electrically controlled operation-performing member adapted to effect an auxiliary machine function, a first data signal means operable to produce a data signal indicating the necessity of carrying out said auxiliary machine function, progressively operable control means having a plurality of stages, means operatively connecting said data signal means with said control means to selectively and sequentially switch said control means from one stage to the next stage exclusively by said data signals, means operatively connecting said operation-performing members with said control means to effectively provide command signals for said operation-performing members to effect said machine function means operable in response to actuation of said first data signal means at the respective stage of said control means to effectively prevent switching of said control means and to actuate said auxiliary operation-performing member to effect said auxiliary operation, and second data signal means operable in response to the performance of said auxiliary operation to switch said control means to continue its cycle.

27. In an automatic system for running a machine through a predetermined cycle of operations each adapted to respond to a predetermined condition which includes a plurality of machine functions controlled by respective electrically controlled operation-performing members rendered effective in response to feed-back data signals from a plurality of data signal means comprising: a progressively operable control device having a plurality of stages, means operatively connecting said data signal means with said control device to selectively and sequentially switch said control means from one stage to the next stage exclusively in response to coincidence of the presence of a predetermined stage and the operation of a respective data signal means to produce a data signal, means in said control device effectively producing stage responsive command signals, means operatively connecting said operation-performing members with said command signal producing means to selectively apply said command signals to said operation-performing members to effect said machine functions, auxiliary means in said working machine operable at a stage of said control device to signal a deviation from said predetermined condition of one of said operations, auxiliary machine function means on said working machine operable to remedy said deviation, and means operable in response to the operation of said auxiliary means to render said auxiliary machine function means effective.

28. In an automatic system for running a working machine through a predetermined cycle which includes a plurality of predetermined machine functions controlled by respective electrically controlled operation-performing members to be selectively rendered effective governed by feed-back data signals from a plurality of data signal means comprising: an auxiliary electrically controlled operation-performing means on said working machine adapted to effect an auxiliary machine function, an auxiliary signal means operable to indicate the necessity of carrying out said auxiliary machine function, a progressively operable control device having indexing means effectively providing a plurality of switch stages, a plurality of data signal lines, each including one of said data signal means and one switch stage only of said control device to effectively provide a coincidence means included in each of said lines and operable to index said control device as well as to be individually rendered effective in sequence, a plurality of outputs of said control device, means connecting said outputs with said control device to effectively condition said outputs in stage-responsive sequence to deliver a command signal, means operatively connecting said operation-performing members with said control device outputs to effectively apply said command signals to said operation-performing members to initiate and terminate said machine functions, means operable in response to the operation of said auxiliary signal means to effectively discontinue the indexing of said control device means at the respective stage thereof and to actuate said auxiliary operation-performing means to effect said auxiliary operation, and means operable in response to the completion of said auxiliary operation to continue the indexing of said control device to continue said predetermined cycle.

29. In a control system for running a machine having a plurality of electrically controlled operation-performing members adapted to perform machine functions and controlled by command signals, and a plurality of data signal means adapted to produce data signals through a cycle following a predetermined machine function sequence under control of a counter device effectively providing a plurality of stages comprising: means operable to effectively switch said counter device exclusively by respective data signals of said data signal means to provide each counting stage as a non-ambiguous expression of the sum of data signals preceding a respective stage of said counter device, means operable in response to respective data signals correlated to a predetermined number of stages of said counter device to effectively provide command signals for said operation-performing members, an auxiliary operation performing member on said working machine adapted to perform an auxiliary machine function in addition to said predetermined function sequence at a predetermined stage thereof, auxiliary data signal means operable to signal a cycle condition which renders said auxiliary machine function necessary, and means operable in response to said auxiliary data signal means to render said auxiliary operation-performing member effective.

30. In sequence control for a working machine having a plurality of primary electrically controlled operation-performing members and a plurality of primary data signal members adapted to produce primary data signals comprising: a first sequence control means having a plurality of effective stages and being operatively connected with said primary operation-performing members and operable to actuate said operation-performing members in a predetermined sequence to perform a first programme, and means operable to switch said first control means from each stage to the next stage exclusively in response to primary data signals from said primary data signal members and coincidence of predetermined respective stages of said first control means and operation of respective primary data signal members, a plurality of secondary electrically controlled operation-performing members, a plurality of secondary data signal members adapted to produce secondary data signals, a second sequence control means having a plurality of effective stages and being operatively connected with said secondary operation-performing members and being operable to actuate said secondary operation-performing members in a predetermined sequence to perform a second programme, means operable to switch said second control means from each stage to the next stage exclusively in response to secondary data signals from said secondary data signal members and coincidence of predetermined respective stages of said secondary control means and operation of respective secondary data signal members, and means operable at a stage of said first programme to render said first sequence control means ineffective and render said second sequence control means effective to control the performance of said second programme and upon completion thereof to render said second sequence control means ineffective and render said first sequence control means effective to continue said first programme.

31. In control means for use with a working machine having machine function means controlling a plurality of machine functions and adapted to be actuated by electrical command signals and data signal means operable to produce data signals indicative of the progress of the operating cycle of machine functions in combination: a progressively operable switch means effectively providing a plurality of stages representing numerical values, means operable to shift said switch means only in response exclusively to one single predetermined coincidence of a data signal and the presence of a correlated stage of said progressively operable switch means to effectively provide data logging represented by said numerical values, means operable to selectively provide command signals at each of said stages of said switch means, and means operable to render a command signal effective to initiate a machine function in response to the presence of the stage correlated to the data signal indicative of the completion of the machine function and to render a command signal effective to terminate a machine function in response to the presence of the stage correlated to the data signal indicative of the termination of the machine function.

32. In a control system for automatically running a machine having a plurality of electrically controlled operation-performing members controlled by command signals, and a plurality of data signal means adapted to produce data signals through a cycle following a predetermined sequence under control of a counter device effectively providing a plurality of stages comprising: means operable to effectively switch said counter device exclusively by respective data signals of said data signal means to provide each counting stage as a non-ambiguous expression of the sum of data signals preceding a respective stage of said counter device, and means operable in response to respective data signals correlated to a predetermined number of stages of said counter device to effectively provide command signals for said operation-performing members, in combination with means operable to alternately switch said counter device stagewise under manual control to effectively simulate said automatic cycle and effectively maintaining each stage thereof.

33. The combination according to claim 32, wherein said last-mentioned means includes auxiliary circuit means having a manually operable switch means with a plurality of stages, and means for effectively connecting said auxiliary circuit means with said counter device to simulate the operation of the data signal means by the stages of said manually operable switch means.

34. Control means for running a working machine having a plurality of electrically controlled operation-performing members controlled by command signals and included in a plurality of command signal lines, and a plurality of data signal means adapted to produce data signals and included in a plurality of data signal lines through a cycle following a predetermined sequence comprising: an electrically controlled counter device effectively providing a plurality of stages, means for connecting said counter device with said data signal lines to effectively switch said counter device exclusively by respective data signals of said data signal means and exclusively upon simultaneous occurrence of a respective stage and of a respective one of said data signal means, means operable exclusively at a predetermined number of stages of said counter device to effectively provide a respective command signal for a correlated operation-performing member through a corresponding one of said command signal lines, manually operable switch means having a plurality of stages, and means for connecting said manual switch means with said data signal lines to effectively switch said counter device exclusively upon simultaneous occurrence of corresponding stages of said counter device and said manual switch means.

References Cited by the Examiner

UNITED STATES PATENTS

| | | |
|---|---|---|
| 2,029,335 | 2/1936 | Oberhoffken et al. |
| 2,384,809 | 9/1945 | Bullard et al. _____ 340—147 |
| 2,838,963 | 6/1958 | Good et al. |
| 2,898,483 | 8/1959 | Muller _____ 340—147 |
| 2,927,258 | 3/1960 | Lippel. |

FOREIGN PATENTS

| | | |
|---|---|---|
| 738,284 | 8/1943 | Germany. |
| 893,742 | 10/1953 | Germany. |

OTHER REFERENCES

Publication I: "Standard Machine Converted for Numerically Controlled Jig Boring," Automotion, October 1958, pp. 75–81, 90/C&T.

Publication II: "Digital Positioning Control for Precision Jig Borer," Electrical Manufacturing, March, 1957, pp. 118–125, 90/C&T.

NEIL C. READ, *Primary Examiner.*

P. XIARHOS, D. YUSKO, *Assistant Examiners.*